US011493009B2

(12) United States Patent
Imai

(10) Patent No.: US 11,493,009 B2
(45) Date of Patent: Nov. 8, 2022

(54) FUEL INJECTION VALVE AND FUEL INJECTION SYSTEM

(71) Applicant: DENSO CORPORATION, Kariya (JP)

(72) Inventor: Keita Imai, Kariya (JP)

(73) Assignee: DENSO CORPORATION, Kariya (JP)

(*) Notice: Subject to any disclaimer, the term of this patent is extended or adjusted under 35 U.S.C. 154(b) by 21 days.

(21) Appl. No.: 16/291,320

(22) Filed: Mar. 4, 2019

(65) Prior Publication Data
US 2019/0277237 A1    Sep. 12, 2019

(30) Foreign Application Priority Data

Mar. 8, 2018  (JP) ................................ JP2018-42227

(51) Int. Cl.
*F02M 61/18* (2006.01)
*F02M 51/06* (2006.01)
(Continued)

(52) U.S. Cl.
CPC ......... *F02M 61/1886* (2013.01); *F02D 41/40* (2013.01); *F02M 51/0625* (2013.01);
(Continued)

(58) Field of Classification Search
CPC ............. F02M 61/165; F02M 61/1826; F02M 61/1833; F02M 61/1846; F02M 61/1886; F02D 41/402; F02D 41/403; F02D 41/405

See application file for complete search history.

(56) References Cited

U.S. PATENT DOCUMENTS 5,016,820 A * 5/1991 Gaskell ..................... B23H 9/00
239/533.12
5,540,200 A * 7/1996 Naitoh .................. F02M 51/065
123/299

(Continued)

FOREIGN PATENT DOCUMENTS

EP    3091219        11/2016
EP    3103999 A1 *  12/2016  ............. F02M 61/08

(Continued)

OTHER PUBLICATIONS

U.S. Appl. No. 16/291,249 of Harada, et al., filed Mar. 4, 2019 (73 pages).

(Continued)

*Primary Examiner* — Logan M Kraft
*Assistant Examiner* — Joshua Campbell
(74) *Attorney, Agent, or Firm* — Nixon & Vanderhye P.C.

(57) ABSTRACT

An injection hole body has injection holes to inject fuel. A valve body forms a fuel passage with an inner surface of the injection hole body to communicate with inflow ports of the injection holes. The valve body opens and closes the fuel passage by being seated on and unseated from a seating surface of the injection hole body. An inflow port gap distance is a gap between the valve body and the inflow ports along a center axis of the valve body. An inter-injection hole distance is a distance between inflow ports, which are adjacent to each other, among the inflow ports placed around the center axis. The inter-injection hole distance is smaller than the inflow port gap distance in a state where the valve body is unseated from the seating surface and is at a farthest position in its movable range.

27 Claims, 23 Drawing Sheets

(51) Int. Cl.
*F02M 61/16* (2006.01)
*F02D 41/40* (2006.01)

(52) U.S. Cl.
CPC ...... *F02M 61/165* (2013.01); *F02M 61/1833* (2013.01); *F02M 2200/27* (2013.01)

(56) References Cited

U.S. PATENT DOCUMENTS

| | | | |
|---|---|---|---|
| 2005/0224605 A1 | 10/2005 | Dingle | |
| 2005/0224606 A1* | 10/2005 | Dingle | F02B 19/14 239/533.2 |
| 2005/0235949 A1* | 10/2005 | Okada | F02M 51/0603 123/294 |
| 2008/0116301 A1* | 5/2008 | Yasukawa | F02M 61/1853 239/533.12 |
| 2009/0012698 A1* | 1/2009 | Shinagawa | F02M 21/0284 701/103 |
| 2011/0068188 A1* | 3/2011 | Laimboeck | F02B 23/0669 239/601 |
| 2014/0130772 A1 | 5/2014 | Maeda et al. | |
| 2015/0021416 A1* | 1/2015 | Raney | F02M 61/1806 239/584 |
| 2015/0233334 A1* | 8/2015 | Miyamoto | F02M 51/06 239/584 |
| 2019/0195181 A1* | 6/2019 | Brown | F02M 61/165 |

FOREIGN PATENT DOCUMENTS

| | | |
|---|---|---|
| GB | 2 324 571 | 10/1998 |
| JP | 2003-28032 | 1/2003 |
| JP | 2005-282420 | 10/2005 |
| JP | 2007321592 A * | 12/2007 |
| JP | 2014-214622 | 11/2014 |
| JP | 2016-98702 | 5/2016 |
| JP | 2017-190753 | 10/2017 |

OTHER PUBLICATIONS

U.S. Appl. No. 16/291,270 of Imai, filed Mar. 4, 2019 (77 pages).
U.S. Appl. No. 16/291,270, filed Mar. 4, 2019, Fuel Injection Valve and Fuel Injection System.
U.S. Appl. No. 16/291,249, filed Mar. 4, 2019, Fuel Injection Valve and Fuel Injection System.

* cited by examiner

FUEL INJECTION VALVE AND FUEL INJECTION SYSTEM

CROSS REFERENCE TO RELATED APPLICATION

This application is based on Japanese Patent Application No. 2018-42227 filed on Mar. 8, 2018, the disclosure of which is incorporated herein by reference.

TECHNICAL FIELD

The present disclosure relates to a fuel injection valve and a fuel injection system.

BACKGROUND

A fuel injection valve is widely used for injecting fuel for causing combustion in an internal combustion engine. The fuel injection valve includes a valve element and a nozzle body. The valve element opens and closes a fuel passage by being unseated from and seated on a valve seat of the nozzle body.

SUMMARY

According to an aspect of the present disclosure, a fuel injection valve includes an injection hole body, which has injection holes to inject fuel for causing combustion in an internal combustion engine, and a valve body configured to open and close a fuel passage by being seated on and unseated from the injection hole body. An inter-injection hole distance is a distance between adjacent inflow ports around a center axis of the valve body. The inter-injection hole distance is set to a specific value.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

Figure 1:
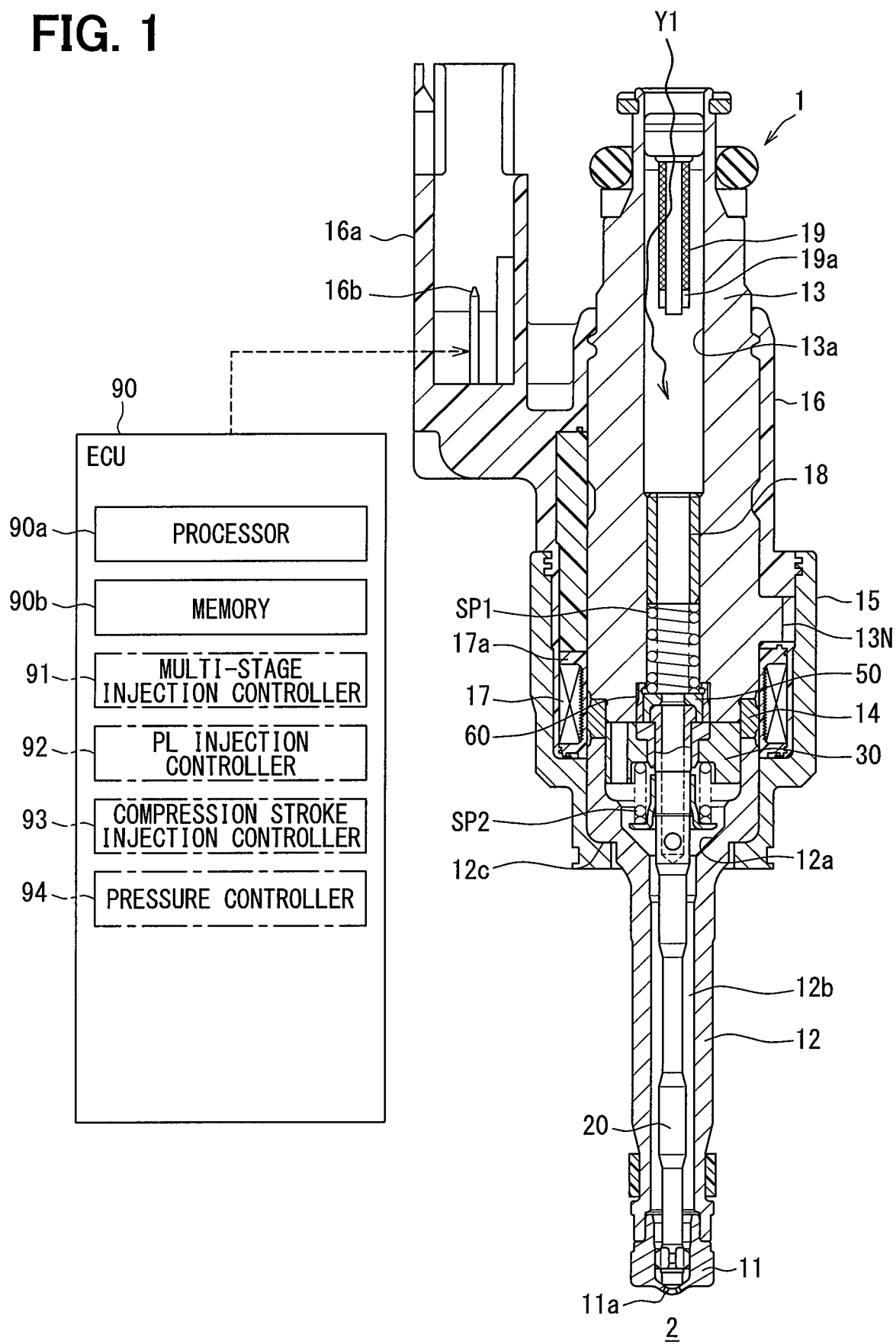
FIG. 1 is a cross-sectional view showing a fuel injection valve according to a first embodiment.

According to an example of the present disclosure, a fuel injection valve is provided for injecting fuel from its injection holes for causing combustion in an internal combustion engine. The fuel injection valve includes an injection hole body having the injection holes and further includes a valve body. The valve body forms a fuel passage between the valve body and an inner surface of the injection hole body to communicate with the injection holes. The valve body opens and closes the fuel passage by being unseated from and seated on a seating surface of the injection hole body.

In the example of the present disclosure, it is considered that a flow direction of fuel in the fuel passage and a flow direction of the fuel in the injection hole could be significantly different from each other. For that reason, when the fuel flows from the fuel passage into an inflow port of the injection hole, the flow direction of the fuel could sharply change (bend). Therefore, a large pressure loss would occur in the fuel due to the bending.

According to an aspect of the present disclosure, a fuel injection valve comprises an injection hole body having a plurality of injection holes to inject fuel for causing combustion in an internal combustion engine. The fuel injection valve further comprises a valve body configured to form a fuel passage between the valve body and an inner surface of the injection hole body to communicate with inflow ports of the injection holes. The valve body is configured to open and close the fuel passage by being seated on and unseated from a seating surface of the injection hole body. An inflow port gap distance is a size of a gap between the valve body and the inflow ports in a direction of a center axis of the valve body. An inter-injection hole distance is a distance between inflow ports, which are adjacent to each other, among the inflow ports placed around the center axis. The inter-injection hole distance is smaller than the inflow port gap distance in a state where the valve body is unseated from the seating surface and is at a farthest position in a movable range of the valve body.

Fuel flowing into a portion of the fuel passage (seat downstream passage) on the downstream side of the seating surface may be roughly categorized into a longitudinal inflow fuel and a lateral inflow fuel as described below. The longitudinal inflow fuel is fuel flowing from the seating surface toward an inflow port of the injection hole via the shortest distance. The lateral inflow fuel flows from the seating surface toward a portion (inter-injection hole portion) between the injection holes and subsequently flows from the inter-injection hole portion toward the inflow port of the injection hole. Both the longitudinal inflow fuel and the lateral inflow fuel increase in pressure loss, as the inflow port gap distance decreases in order to reduce the volume of the seat downstream passage. However, with regard to the lateral inflow fuel, the increase in the pressure loss can be mitigated by reducing the inter-injection hole distance. Therefore, the increase in the pressure loss due to the reduction in the inflow port gap distance can be mitigated by the reduction in the inter-injection hole distance.

According to the aspect, the inter-injection hole distance is smaller than the inflow port gap distance. Therefore, the configuration enables to mitigate the pressure loss of the lateral inflow fuel as compared with the case where the distance between the injection holes is larger than the inflow port gap distance. Therefore, the increase in pressure loss caused by the reduction in the inflow port gap distance can be mitigated.

A fuel injection system according to another aspect includes the fuel injection valve of the aspect and a control device configured to control a fuel injection state from the injection holes by controlling the state in which the valve body is unseated from and seated on the seating surface. The configuration enables to produce similar advantages to those of the aspect.

As follows, multiple embodiments of the present disclosure will be described with reference to the drawings. The same reference numerals are assigned to the corresponding elements in each embodiment, and thus, duplicate descriptions may be omitted. In a case where only a part of the configuration is described in an embodiment, the configuration of another embodiment described above may be applied to other parts of the configuration.

First Embodiment

A fuel injection valve 1 shown in FIG. 1 is equipped to a cylinder head of an ignition type internal combustion engine mounted on a vehicle. The fuel injection valve 1 is of a direct injection type configured to directly inject fuel into a combustion chamber 2 of the internal combustion engine. A liquid gasoline fuel stored in a vehicle-mounted fuel tank is pressurized by using a fuel pump (not shown) and supplied to the fuel injection valve 1. The supplied high-pressure fuel is injected into the combustion chamber 2 through injection holes 11*a* of the fuel injection valve 1.

The fuel injection valve 1 is of a center placement type placed at a center of the combustion chamber 2. More specifically, the injection holes 11*a* are located between an intake port and an exhaust port when viewed along an axis line direction of a piston of the internal combustion engine. The fuel injection valve 1 is mounted to the cylinder head so that the axis line direction of the fuel injection valve 1, which corresponds to a vertical direction in FIG. 1, is parallel to the axis line direction of the piston. The fuel injection valve 1 is located on the axis line of the piston or located in the vicinity of an ignition plug provided on the axis line of the piston.

The operation of the fuel injection valve 1 is controlled by a control device 90 mounted on the vehicle. The control device 90 has at least one arithmetic processing device (processor) 90*a* and at least one storage device (memory) 90*b* as a storage medium for storing a program executed by the processor 90*a* and data. The fuel injection valve 1 and the control device 90 configure a fuel injection system.

The processor 90*a* and the memory 90*b* may be provided as a microcomputer. The storage medium is a non-transitory tangible storage medium that non-transitorily stores programs readable by the processor 90*a*. The storage medium may be provided as a semiconductor memory, a magnetic disk, or the like. The control device 90 may be provided as a computer or a set of computer resources linked via a data communication device. The program is executed by the control device 90 to cause the control device 90 to function as a device described in the present specification and to cause the control device 90 to function to perform the methods described in the present specification.

The fuel injection valve 1 includes an injection hole body 11, a main body 12, a stationary core 13, a nonmagnetic member 14, a coil 17, a support member 18, a filter 19, a first spring member SP1 (resilient member), a cup 50, a guide member 60, a movable portion M (refer to FIG. 3), and the like. The movable portion M is an assembly body in which a needle 20 (valve body), a movable core 30, a second spring member SP2, a sleeve 40, and the cup 50 are assembled together. The injection hole body 11, the main body 12, the stationary core 13, the support member 18, the needle 20, the movable core 30, the sleeve 40, the cup 50, and the guide member 60 are made of metal.

Figure 2:
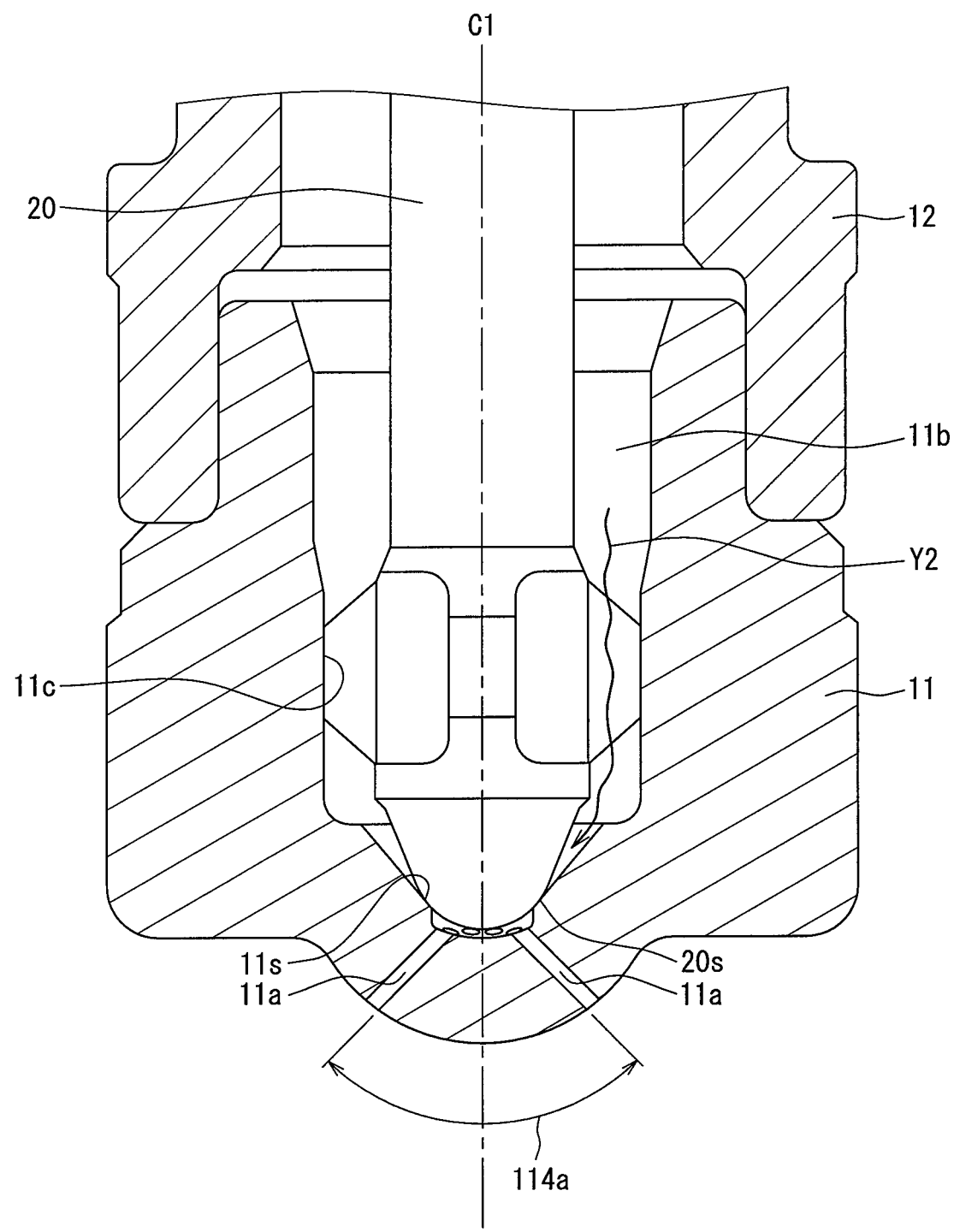
FIG. 2 is an enlarged view showing an injection hole portion in FIG. 1.

As shown in FIG. 2, the injection hole body 11 has the multiple injection holes 11a for injecting the fuel. Each of the injection holes 11a is formed by performing laser processing on the injection hole body 11. The needle 20 is located inside the injection hole body 11. A fuel passage 11b communicating with an inflow port 11in of each injection hole 11a is formed between an outer surface of the needle 20 and an inner surface of the injection hole body 11. The fuel passage 11b is formed between the injection hole body 11 and the needle 20. The fuel passage 11b corresponds to a specific space communicating with the inflow ports 11in of the injection holes 11a.

A seating surface 11s is formed by an inner peripheral surface of the injection hole body 11. A seat surface 20s formed on the needle 20 is unseated from and seated onto the seating surface 11s. The seat surface 20s and the seating surface 11s are shaped to extend annularly around a center axis (axis line C1) of the needle 20. When the needle 20 is unseated from and seated onto the seating surface 11s, the fuel passage 11b is opened and closed, and the injection hole 11a is opened and closed. Specifically, when the needle 20 makes contact with and seats on the seating surface 11s, the fuel passage 11b and the injection hole 11a do not communicate with each other. When the needle 20 moves away from the seating surface 11s and is unseated, the fuel passage 11b and the injection hole 11a communicate with each other. At this time, the fuel is injected from the injection hole 11a.

Figure 8:
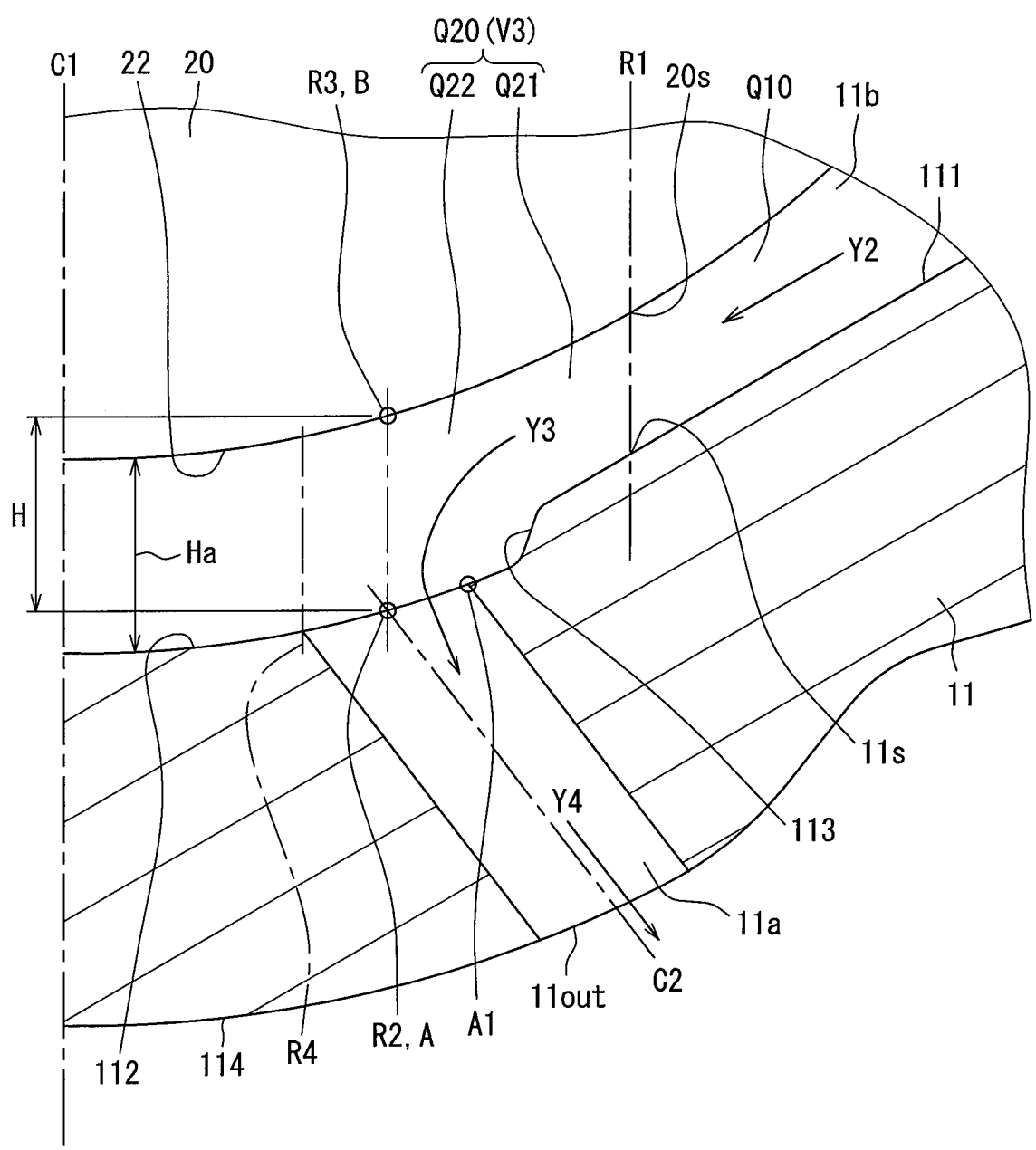
FIG. 8 is a cross-sectional view showing a state in which the needle is at a maximum valve open position according to the first embodiment.
Figure 9:
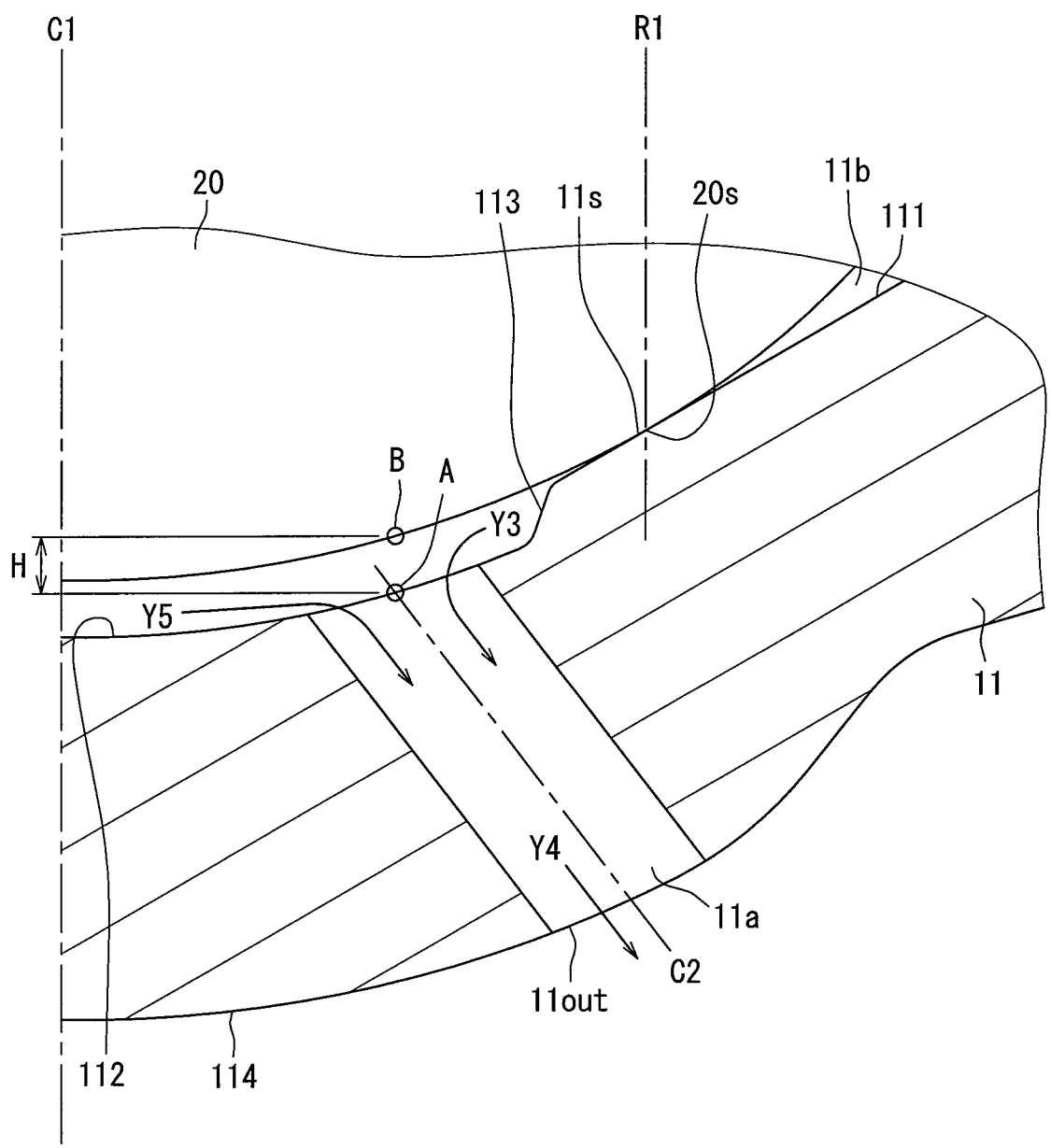
FIG. 9 is a cross-sectional view showing a state in which the needle is closed according the first embodiment.

When the needle 20 is operated to perform a valve closing operation and to cause the seat surface 20s to come into contact with the seating surface 11s, the seat surface 20s and the seating surface 11s come into line contact with each other at a seat position R1 indicated by a one-dot chain line in FIGS. 8 and 9. Thereafter, when the seat surface 20s is pressed against the seating surface 11s by a resilient force of the first spring member SP1, the needle 20 and the injection hole body 11 are resiliently deformed by a pressing force and come into surface contact with each other. A value obtained by dividing the pressing force by a surface contacting area is a seat surface pressure. The first spring member SP1 is set to secure the seat surface pressure equal to or higher than a predetermined value.

Referring back to the illustration of FIG. 1, the main body 12 and the nonmagnetic member 14 are cylindrical in shape. A cylinder end portion of the main body 12, which is a portion closer to the injection hole 11a (injection hole side), is welded and fixed to the injection hole body 11. Specifically, an outer peripheral surface of the injection hole body 11 is mounted on an inner peripheral surface of the main body 12. Subsequently, the main body 12 and the injection hole body 11 are welded to each other. In the present embodiment, the outer peripheral surface of the injection hole body 11 is press-fitted into the inner peripheral surface of the main body 12. A cylinder end portion of the main body 12 on a side away from the injection hole 11a, i.e. on an opposite side of the injection hole, is fixed to a cylindrical end portion of the nonmagnetic member 14 by welding. A cylinder end portion of the nonmagnetic member 14 on the opposite side of the injection hole is fixed to the stationary core 13 by welding.

A nut member 15 is fastened to a threaded portion 13N of the stationary core 13 in a state of being engaged with a locking portion 12c of the main body 12. An axial force caused by the above engagement generates a surface pressure that causes the nut member 15, the main body 12, the nonmagnetic member 14, and the stationary core 13 to be pressed against each other along the direction of the axis line C1, that is, in the vertical direction in FIG. 1.

The main body 12 is made of a magnetic material such as stainless steel. The main body 12 has a flow channel 12b for allowing the fuel to flow toward the injection hole 11a. The needle 20 is accommodated in the flow channel 12b and movable in the direction of the axis line C1. A movable portion M (refer to FIG. 4), which is an assembly body including the needle 20, the movable core 30, the second spring member SP2, the sleeve 40, and the cup 50, is accommodated in the movable chamber 12a in a movable state.

The flow channel 12b communicates with a downstream side of the movable chamber 12a and extends along the direction of the axis line C1. The center line of the flow channel 12b and the movable chamber 12a coincides with the cylinder center line (axis line C1) of the main body 12. An injection hole side portion of the needle 20 is slidably supported by an inner wall surface 11c of the injection hole body 11. A portion of the needle 20 opposite to the injection hole is slidably supported by the inner wall surface of the cup 50. The two positions of the upstream end portion and the downstream end portion of the needle 20 are slidably supported in this manner. In this way, the movement of the needle 20 in the radial direction is limited, and an inclination of the needle 20 with respect to the axis line C1 of the main body 12 is also limited.

The needle 20 corresponds to a valve body that opens and closes the injection hole 11a by opening and closing the fuel passage 11b. The needle 20 is formed of a magnetic material, such as stainless steel, and is in a shape extending in the direction of the axis line C1. The above-described seat surface 20s is formed on an end face of the needle 20 on the downstream side. When the needle 20 moves toward the downstream side along the direction of the axis line C1 with the valve closing operation, the seat surface 20s is seated on the seating surface 11s, and the fuel passage 11b and the injection hole 11a are closed. When the needle 20 moves toward the upstream side along the direction of the axis line C1 with a valve opening operation, the seat surface 20s is unseated from the seating surface 11s, and the fuel passage 11b and the injection hole 11a are opened.

The cup 50 has a disc portion 52 in a shape of a disk and a cylindrical portion 51 in a shape of a cylinder. The disc portion 52 has a through hole 52a extending along the direction of the axis line C1. A surface of the disc portion 52 on the opposite side of the injection hole functions as a spring abutment surface 52b that is in contact with the first spring member SP1. A surface of the disc portion 52 on the injection hole side functions as a valve closing force transmission abutment surface 52c that makes contact with the needle 20 and transmits a first resilient force (valve closing resilient force). The cylindrical portion 51 is in a cylindrical shape extending from an outer peripheral end of the disc portion 52 toward the injection hole. The injection hole side end face of the cylindrical portion 51 functions as a core contact end surface 51a that makes contact with the movable core 30. An inner wall surface of the cylindrical portion 51 slides with an outer peripheral surface of an abutment portion 21 of the needle 20.

The stationary core 13 is made of a magnetic material, such as stainless steel, and has a flow channel 13a for allowing the fuel to flow toward the injection hole 11a. The flow channel 13a communicates with an internal passage 20a formed inside the needle 20 (refer to FIG. 3) and an upstream side of the movable chamber 12a. The flow channel 13a extends along the direction of the axis line C1.

The guide member 60, the first spring member SP1, and the support member 18 are accommodated in the flow channel 13a.

The support member 18 is in a cylindrical shape and is press-fitted and fixed to the inner wall surface of the stationary core 13. The first spring member SP1 is a coil spring located on the downstream side of the support member 18. The first spring member SP1 is resiliently deformed in the direction of the axis line C1. An upstream side end face of the first spring member SP1 is supported by the support member 18. A downstream side end face of the first spring member SP1 is supported by the cup 50. The cup 50 is urged toward the downstream side by a force (first resilient force) caused by a resilient deformation of the first spring member SP1. With adjustment of the amount of press-fit of the support member 18 in the direction of the axis line C1, a magnitude of the resilient force for urging the cup 50 (a first set load) is adjusted.

The filter 19 is in a mesh shape and captures foreign matter contained in the fuel supplied to the fuel injection valve 1. The filter 19 is held by a holding member 19a. The holding member 19a is press-fitted to and fixed with an upstream side portion of the support member 18 in the inner wall surface of the stationary core 13. The filter 19 is in a cylindrical shape. As indicated by an arrow Y1 in FIG. 1, the fuel flowing along the cylinder axis line direction of the filter 19 into the inside of the cylinder flows outward in the radial direction of the filter 19 to pass through the filter 19.

Figure 3:
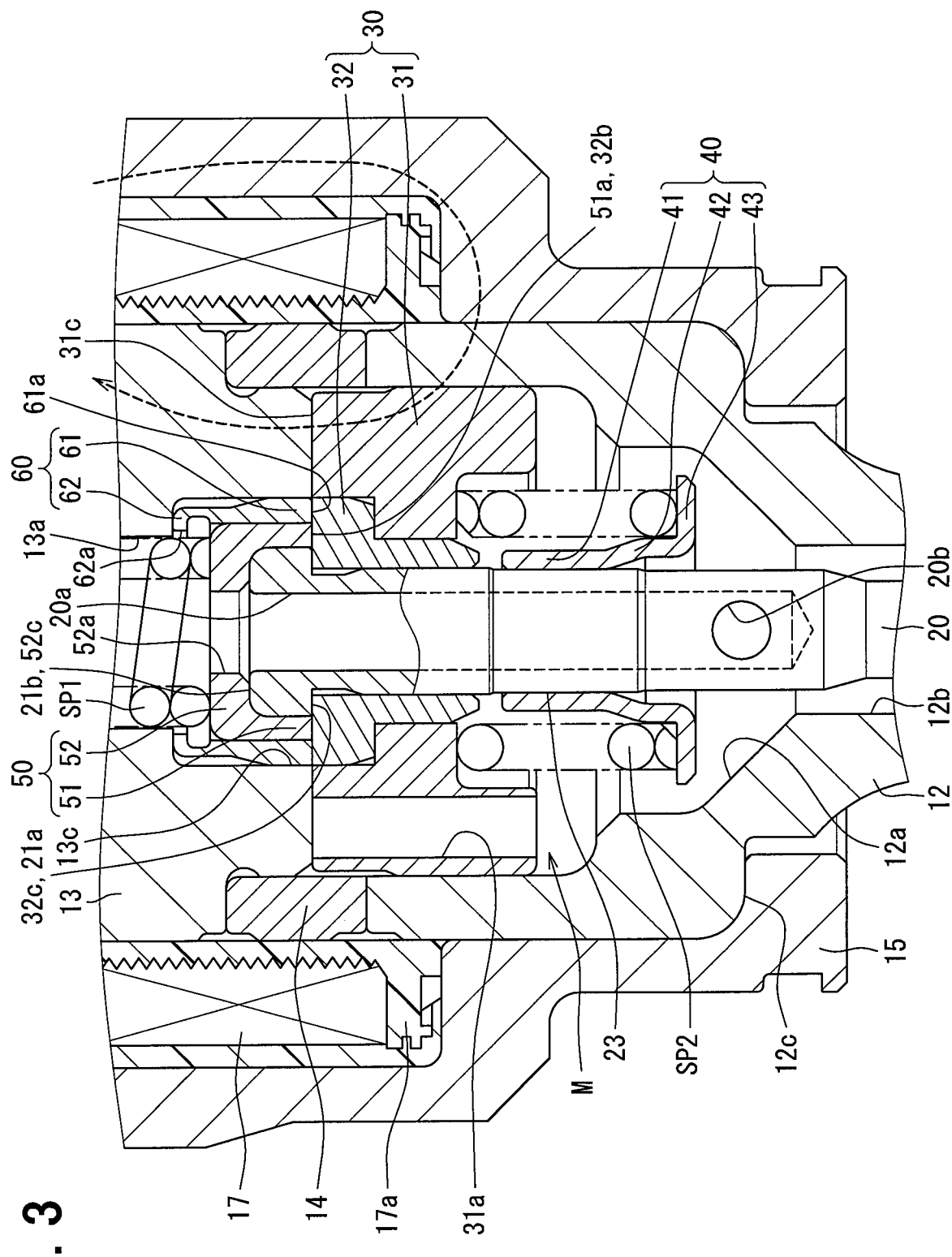
FIG. 3 is an enlarged view showing a movable core portion in FIG. 1.

As shown in FIG. 3, the guide member 60 is in a cylindrical shape and is made of a magnetic material, such as stainless steel. The guide member 60 is press-fitted to and fixed with the stationary core 13. The injection hole side end face of the guide member 60 functions as a stopper abutment end face 61a that makes contact with the movable core 30. An inner wall surface of the guide member 60 slides with an outer peripheral surface 51d of the cylindrical portion 51 of the cup 50. In short, the guide member 60 has a guide function, which is to slide on the outer peripheral surface of the cup 50 when moving along the direction of the axis line C1, and a stopper function, which is to make contact with the movable core 30 when moving along the direction of the axis line C1 to restrict the movement of the movable core 30 toward the side opposite of the injection holes.

A resin member 16 is provided on an outer peripheral surface of the stationary core 13. The resin member 16 has a connector housing 16a. A terminal 16b is accommodated in the connector housing 16a. The terminal 16b is electrically connected to the coil 17. An external connector (not shown) is connected to the connector housing 16a. An electric power is supplied to the coil 17 through the terminal 16b. The coil 17 is wound around a bobbin 17a having an electrical insulation property and is in a cylindrical shape. The coil 17 is located on a radially outer side of the stationary core 13, the nonmagnetic member 14, and the movable core 30. As shown by a dotted arrow in FIG. 3, the stationary core 13, the nut member 15, the main body 12, and the movable core 30 form a magnetic circuit for carrying a magnetic flux generated in accordance with the power supply (energization) to the coil 17.

As shown in FIG. 3, the movable core 30 is located on the injection hole side with respect to the stationary core 13. The movable core 30 is accommodated in the movable chamber 12a in a state of being movable in the direction of the axis line C1. The movable core 30 has an outer core 31 and an inner core 32. The outer core 31 is in a cylindrical shape and is made of a magnetic material, such as stainless steel. The inner core 32 is in a cylindrical shape and is made of a nonmagnetic material, such as stainless steel, having magnetic properties. The outer core 31 is press-fitted to and fixed with an outer peripheral surface of the inner core 32.

The needle 20 is inserted into a cylindrical inner portion of the inner core 32. The inner core 32 is assembled to the needle 20 so as to be slidable with respect to the needle 20 along the direction of the axis line C1. The inner core 32 makes contact with the guide member 60 as a stopper member, the cup 50, and the needle 20. For that reason, a material having a higher hardness than that of the outer core 31 is used for the inner core 32. The outer core 31 has a core facing surface 31c facing the stationary core 13. A gap is formed between the core facing surface 31c and the stationary core 13. Therefore, in a state in which the magnetic flux flows in the coil 17 with energization as described above, a magnetic attraction force toward the stationary core 13 acts on the outer core 31 through the gap.

The sleeve 40 is press-fitted to and fixed with the needle 20 and supports an injection hole side end face of the second spring member SP2. The second spring member SP2 is a coil spring located on the side of a support portion 43 opposite to the injection holes. The second spring member SP2 is resiliently deformed in the direction of the axis line C1. An end face of the second spring member SP2 opposite to the injection holes is supported by the outer core 31. An injection hole side end face of the second spring member SP2 is supported by the support portion 43. The outer core 31 is urged toward the opposite side of the injection holes by a force (second resilient force) caused by the resilient deformation of the second spring member SP2. With adjustment of the amount of press-fit of the sleeve 40 along the direction of the axis line C1, a magnitude of the second resilient force urging the movable core 30 (a second set load) at the time of the valve closing is adjusted. The second set load of the second spring member SP2 is smaller than the first set load of the first spring member SP1.

Description of Operation

Subsequently, the operation of the fuel injection valve 1 will be described with reference to FIGS. 4 and 5.

First, an outline of the operation of the fuel injection valve 1 will be described. On generation of the magnetic attraction force by energizing the coil 17 to attract the movable core 30, the movable core 30 makes contact with the needle 20 when the movable core 30 is moved by a predetermined amount toward the opposite side of the injection holes, thereby to activate the needle 20 to perform the valve opening operation. That is, after the movable core 30 has moved by the predetermined amount, the needle 20 starts the valve opening operation. When the energization of the coil 17 is turned off, the cup 50 makes contact with the needle 20 when the cup 50 is moved toward the injection hole side together with the movable core 30, thereby to cause the needle 20 to perform the valve closing operation. That is, after the cup 50 and the movable core 30 have moved by the predetermined amount, the needle 20 starts the valve closing operation. In short, the fuel injection valve 1 is of a direct acting type including the movable core 30 and the needle 20. The movable core 30 is attracted and moved by the magnetic force generated by the energization, and the needle 20 moves together with the movable core 30 to be unseated from the seating surface 11s thereby to perform the valve opening operation.

Subsequently, the operation of the fuel injection valve 1 will be described in detail. As shown by (a) in FIG. 4, in a state in which the energization of the coil 17 is turned off, no magnetic attraction force is generated, so that the magnetic attraction force caused toward the valve opening side does not act on the movable core 30. The cup 50 urged toward the valve closing side by the first resilient force of the first spring member SP1 makes contact with a valve-closing-state valve body abutment surface 21*b* (refer to FIG. 3) of the needle 20 and the inner core 32 to transmit the first resilient force.

The movable core 30 is urged toward the valve closing side by the first resilient force of the first spring member SP1 transmitted from the cup 50. In addition, the movable core 30 is also urged toward the valve opening side by the second resilient force of the second spring member SP2. Since the first resilient force is larger than the second resilient force, the movable core 30 is biased by the cup 50 and is moved (lifted down) toward the injection holes. The needle 20 is urged toward the valve closing side by the first resilient force transmitted from the cup 50. Thus, the needle 20 is biased by the cup 50 to move (lift down) toward the injection hole side. That is, the needle 20 is seated on the seating surface 11*s* to be in the valve closed state. In the valve closed state, a gap is formed between a valve-opening-state valve body abutment surface 21*a* (refer to FIG. 3) of the needle 20 and the inner core 32. A length of the gap along the direction of the axis line C1 in the valve closed state is referred to as a gap amount L1.

Figure 4:
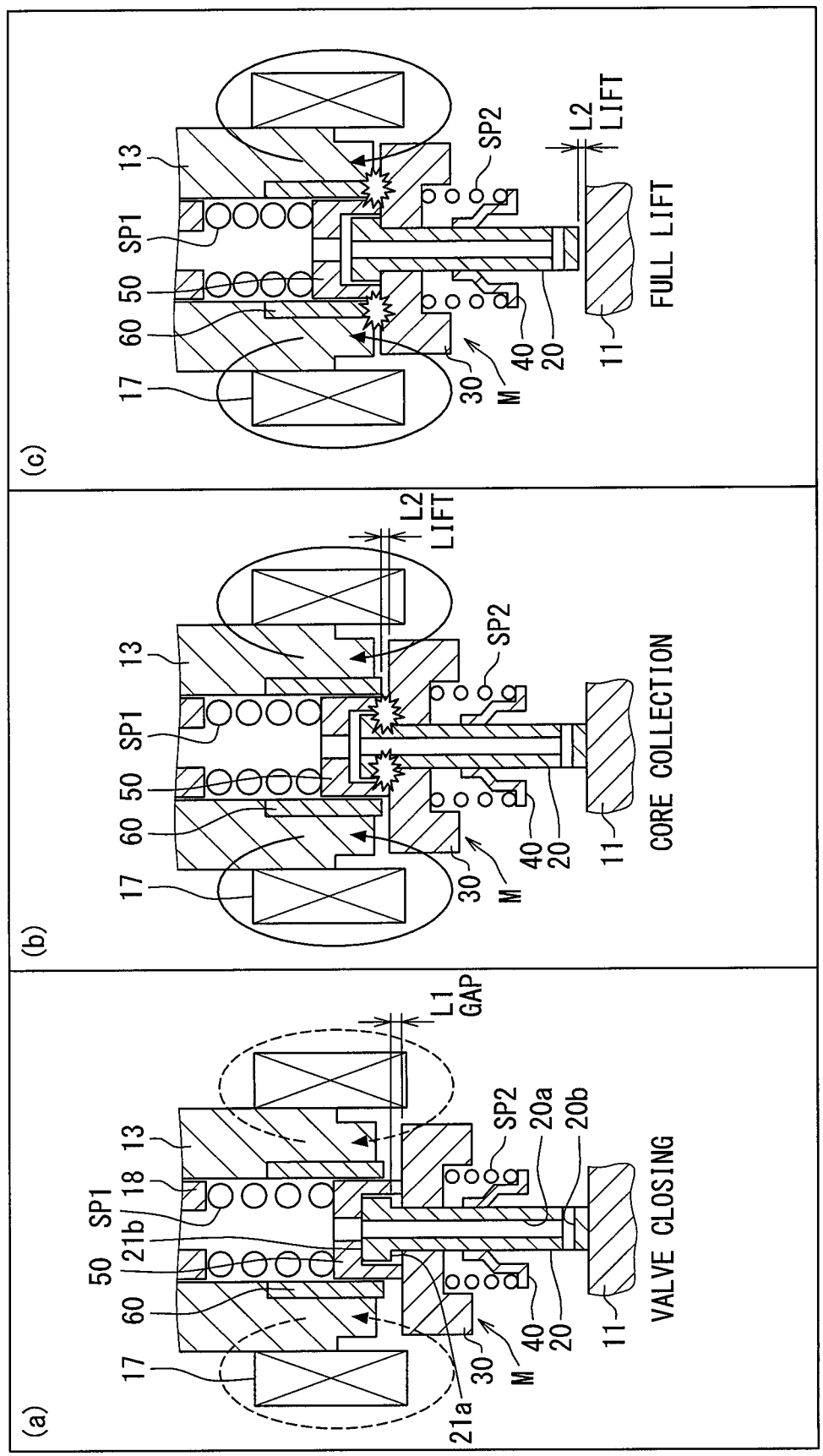
FIG. 4 includes (a) to (c) which are schematic views showing an operation of the fuel injection valve according to the first embodiment, in which (a) shows a valve closed state, (b) shows a state in which the movable core, which moves by application of a magnetic attraction force, collides with a valve body, and (c) shows a state in which the movable core, which moves further by application of the magnetic attraction, collides with a guide member.
Figure 5:
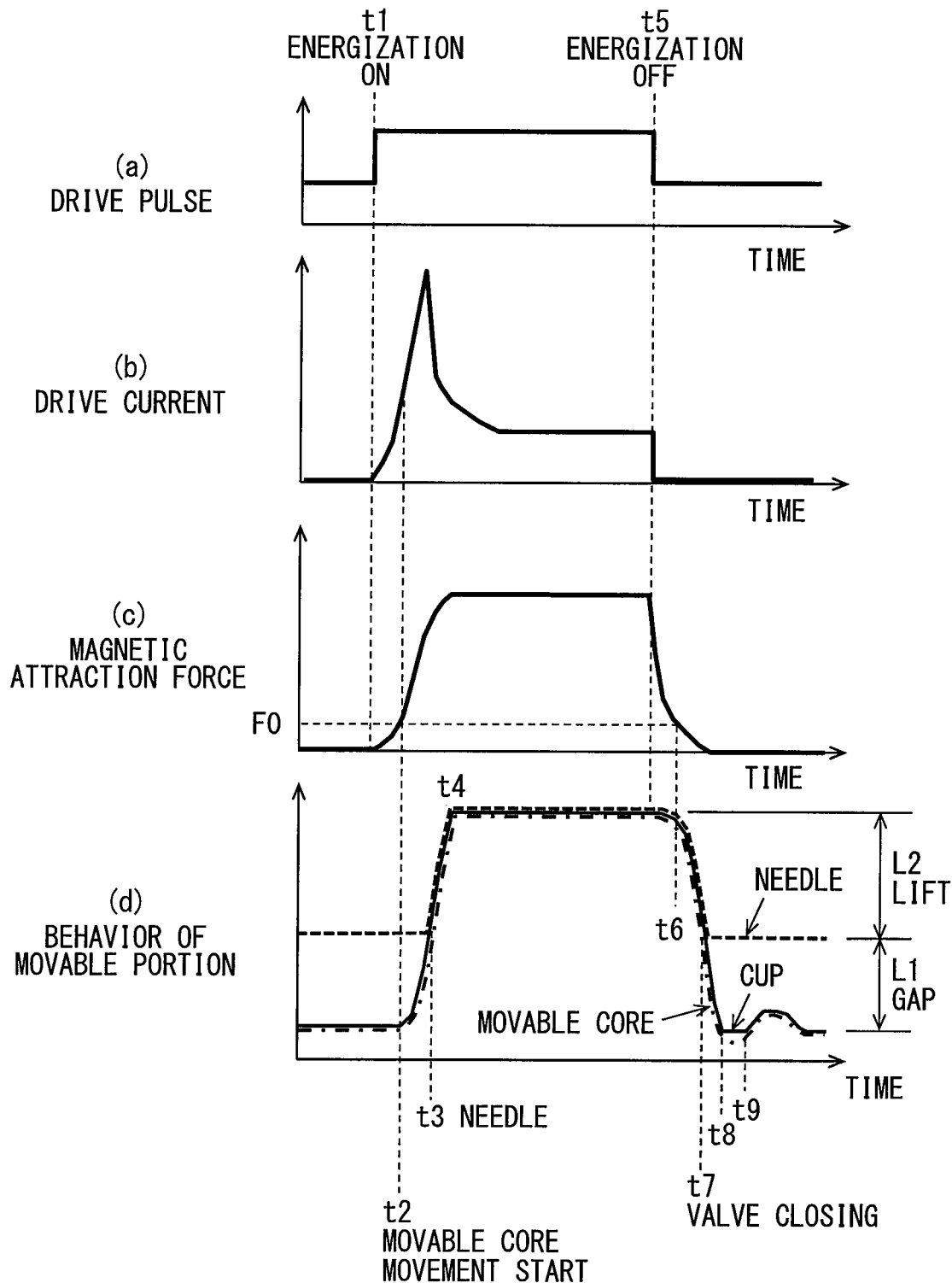
FIG. 5 includes (a) to (d) which are time charts showing the operation of the fuel injection valve according to the first embodiment, in which (a) shows a change in a drive pulse, (b) shows a change in a drive current, (c) shows a change in the magnetic attraction force, and (d) shows a behavior of a movable portion.

As shown by (b) in FIG. 4, in a state immediately after the energization of the coil 17 is switched from OFF to ON, the magnetic attraction force acts on the movable core 30 toward the valve opening side. Thus, the movable core 30 starts moving toward the valve opening side. Subsequently, the movable core 30 moves while biasing the cup 50 upward. When the amount of movement reaches the gap amount L1, the inner core 32 collides with the valve-opening-state valve body abutment surface 21*a* of the needle 20. At the time of the collision, a gap is formed between the guide member 60 and the inner core 32. The length of the gap along the direction of the axis line C1 is referred to as a lift amount L2.

After the collision, the movable core 30 continues to move further by application of the magnetic attraction force. When the movement amount after the collision reaches the lift amount L2, the inner core 32 collides with the guide member 60 and stops moving as shown by (c) in FIG. 4. A separation length between the seating surface 11*s* and the seat surface 20*s* along the direction of the axis line C1 at the time of stopping the movement corresponds to a full lift amount of the needle 20. The separation length coincides with the lift amount L2 described above. The separation length corresponds to a needle separation length Ha (valve body separation length) shown in FIG. 8.

The above-described operation will be further described in detail with reference to (a) to (c) in FIG. 5. First, when the energization is switched ON at a time point t1 as shown by (a) in FIG. 5, a drive current flowing through the coil 17 starts to rise (refer to (b) in FIG. 5). Thus, the magnetic attraction force also starts to rise with the rise of the drive current (refer to (c) in FIG. 5). A value obtained by subtracting the second resilient force from the first resilient force (valve closing resilient force) is an actual valve closing resilient force F0. The movable core 30 starts moving toward the valve opening side at a time point t2 when the magnetic attraction force rises to the actual valve closing resilient force F0. Before the drive current reaches a peak value, the movable core 30 starts moving. A boost voltage generated by boosting a battery voltage is applied to the coil 17 until the drive current reaches the peak value. In addition, the battery voltage is applied to the coil 17 after the drive current has reached the peak value.

Thereafter, at a time point t3 when the moving amount of the movable core 30 reaches the gap amount L1, the movable core 30 collides with the needle 20, and the needle 20 starts the valve opening operation. As a result, fuel is injected from the injection holes 11*a*. Thereafter, the movable core 30 lifts up the needle 20 against the valve closing resilient force. At a time point t4 when the movable core 30 collides with the guide member 60, the lift amount of the needle 20 reaches the full lift amount L2. Thereafter, the full lift state of the needle 20 is maintained by the magnetic attraction force. Thus, the fuel injection is continued. Thereafter, when the energization is switched OFF at a time point t5, the magnetic attraction force also decreases with decrease in the drive current. At a time point t6 when the magnetic attraction force reaches the actual valve closing resilient force F0, the movable core 30 starts moving toward the valve closing side together with the cup 50. The needle 20 is biased against pressure of the fuel filled between and the needle 20 and the cup 50 to initiate a lift-down (valve closing operation) as soon as the cup 50 begins to move.

Thereafter, at a time point t7 when the needle 20 is lifted down by the lift amount L2, the seat surface 20*s* is seated on the seating surface 11*s*. Thus, the fuel passage 11*b* and the injection hole 11*a* are closed. Thereafter, the movable core 30 continues to move toward the valve closing side together with the cup 50. The movement of the cup 50 toward the valve closing side is stopped at a time point t8 when the cup 50 makes contact with the needle 20. Thereafter, the movable core 30 further continues to move toward the valve closing side (inertial movement) by an inertial force. Thereafter, the movable core 30 moves (rebounds) toward the valve opening side by the resilient force of the second spring member SP2. Thereafter, the movable core 30 collides with the cup 50 at a time point t9 and moves (rebound) toward the valve opening side together with the cup 50. However, the movable core 30 is immediately biased back by the valve closing resilient force to converge to the initial state shown by (a) in FIG. 4.

In consideration of that, the smaller the rebound is, the shorter a time required for convergence is, and the shorter a time from the end of injection to the return to the initial state is. For that reason, in the multi-stage injection to inject the fuel for a plurality of times per combustion cycle of the internal combustion engine, an interval between the injections can be shortened. Thus, the number of injections in the multi-stage injection can be increased.

The above-described energization ON/OFF is controlled by the processor 90*a* executing the program stored in the memory 90*b*. Fundamentally, a fuel injection amount, an injection timing, and the number of injections relating to the multi-stage injection in one combustion cycle are calculated by the processor 90*a* based on a load and a rotation speed of the internal combustion engine. Further, the processor 90*a* executes various programs to perform a multi-stage injection control, a partial lift injection control (PL injection control), a compression stroke injection control, and a pressure control, which will be described below. The control device 90 when executing those controls corresponds to a multi-stage injection control unit 91, a partial lift injection control unit (PL injection control unit) 92, a compression stroke injection control unit 93, and a pressure control unit 94 shown in FIG. 1.

The multi-stage injection control unit 91 controls the energization ON/OFF of the coil 17 so as to inject the fuel from the injection holes 11*a* for multiple times in one combustion cycle of the internal combustion engine. The PL injection control unit 92 controls the energizing ON/OFF of the coil 17 such that after the needle 20 has been unseated from the seating surface 11s, the needle 20 starts the valve closing operation before reaching a maximum valve opening position. For example, as the number of the multi-stage injections increases, the injection amount of one injection becomes very small. Therefore, in the case of such a small amount of injection, the PL injection control is executed.

The compression stroke injection control unit 93 controls the energization ON/OFF of the coil 17 so as to inject the fuel from the injection holes 11a in a period including a part of a compression stroke period of the internal combustion engine. When the fuel is injected into the combustion chamber 2 in the compression stroke period, a time from an injection start timing to an ignition timing is short. Therefore, a time for sufficiently mixing the fuel and an air is short. For that reason, the fuel injection valve 1 of this type is required to inject the fuel from the injection holes 11a with a high penetration force in order to promote mixing of the fuel and the air. In addition, an injection pressure is required to increase in order to divide spray in a short time.

The pressure control unit 94 controls the pressure (fuel supply pressure) of the fuel to be supplied to the fuel injection valve 1 to any target pressure within a predetermined range. Specifically, the pressure control unit 94 controls the fuel supply pressure by controlling a fuel discharge amount from the fuel pump described above. A force, by which the needle 20 is pressed on the seating surface 11s, is a minimum fuel pressure valve closing force caused by the fuel pressure when a target pressure is set to a minimum value in a predetermined range. The first resilient force (valve closing resilient force) caused by the first spring member SP1 is set to be smaller than the minimum fuel pressure valve closing force.

(Detailed Description of Fuel Passage 11b)

Figure 6:
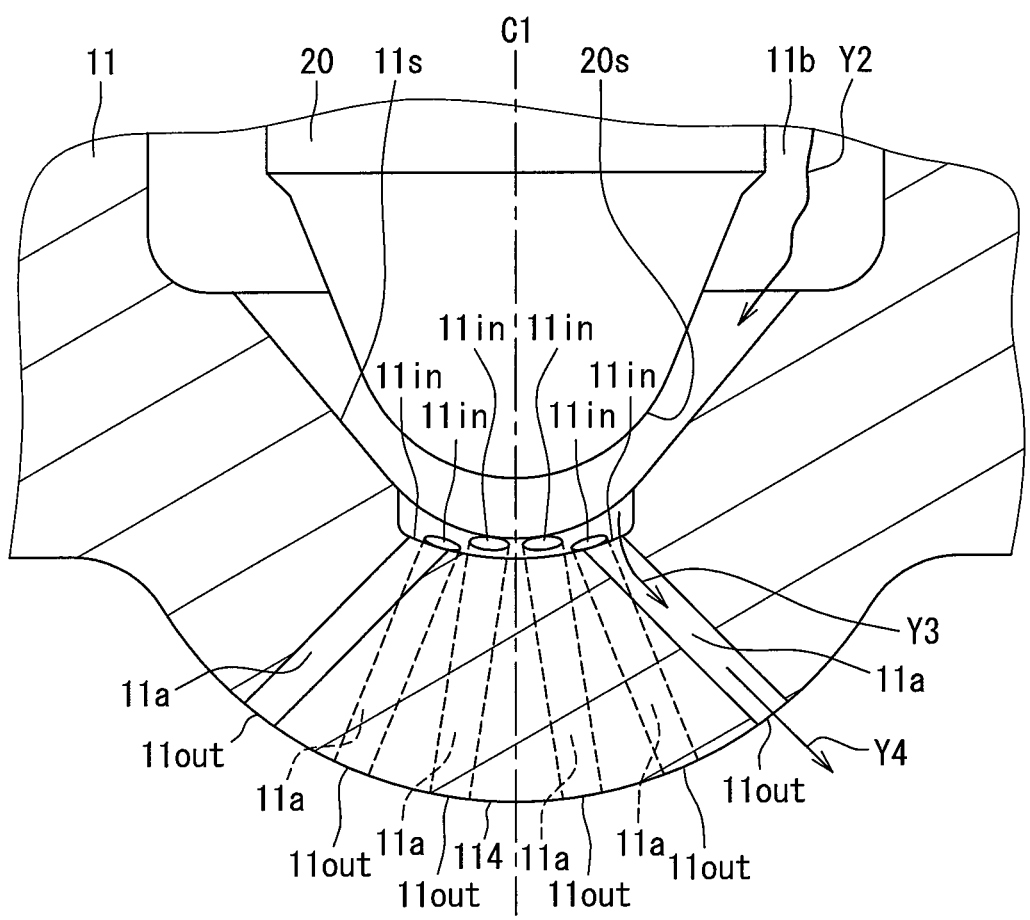
FIG. 6 is an enlarged view of FIG. 2 showing a state in which a needle is open.

Hereinafter, the fuel passage 11b will be described in detail with reference to FIGS. 6 to 12. The fuel passage 11b includes at least a space between a tapered surface 111, a body bottom surface 112, and a coupling surface 113, and a valve body tip end face 22, which will be described later. As shown in FIG. 6, the fuel flowing through the fuel passage 11b flows toward the seat surface 20s as indicated by an arrow Y2, and subsequently passes through a gap (seat gap) between the seat surface 20s and the seating surface 11s. The fuel flows in a direction toward the axis line C1 until reaching the seat gap. The fuel that has passed through the seat gap changes the fuel direction to a direction away from the axis line C1 as indicated by an arrow Y3, flows. Subsequently, the fuel flows into the inflow ports 11 in of the injection holes 11a. The fuel flowing in from the inflow ports 11 in is regulated in the injection holes 11a, and is injected into the combustion chamber 2 from outflow ports 11out of the injection holes 11a as indicated by an arrow Y4. In addition to the fuel changing in the flow direction to the direction away from the axis line C1 and flowing into the inflow ports 11 in (refer to the arrow Y3), there is also a fuel flowing from a sac chamber Q22 into the inflow ports 11 in as indicated by an arrow Y5 in FIG. 9.

Multiple injection holes 11a are formed. The inflow ports 11in of the multiple injection holes 11a are placed at equal intervals on a virtual circle (inflow central virtual circle R2) centered on the axis line C1. The outflow ports 11out of the multiple injection holes 11a are similarly placed at equal intervals around the axis line C1. In other words, both of the inflow ports 11in and the outflow ports 11out are placed at equal intervals on a concentric circle. The shapes and sizes of the multiple injection holes 11a are all the same. Specifically, each of the injection holes 11a is in a straight shape, in which a shape of the passage cross section is a perfect circle and in which a diameter of the perfect circle does not change from the inflow port 11in to the outflow port 11out. The passage cross section referred to in the present description is a cross-section taken perpendicularly to an axis line C2 passing through the center of each injection hole 11a.

Figure 7:
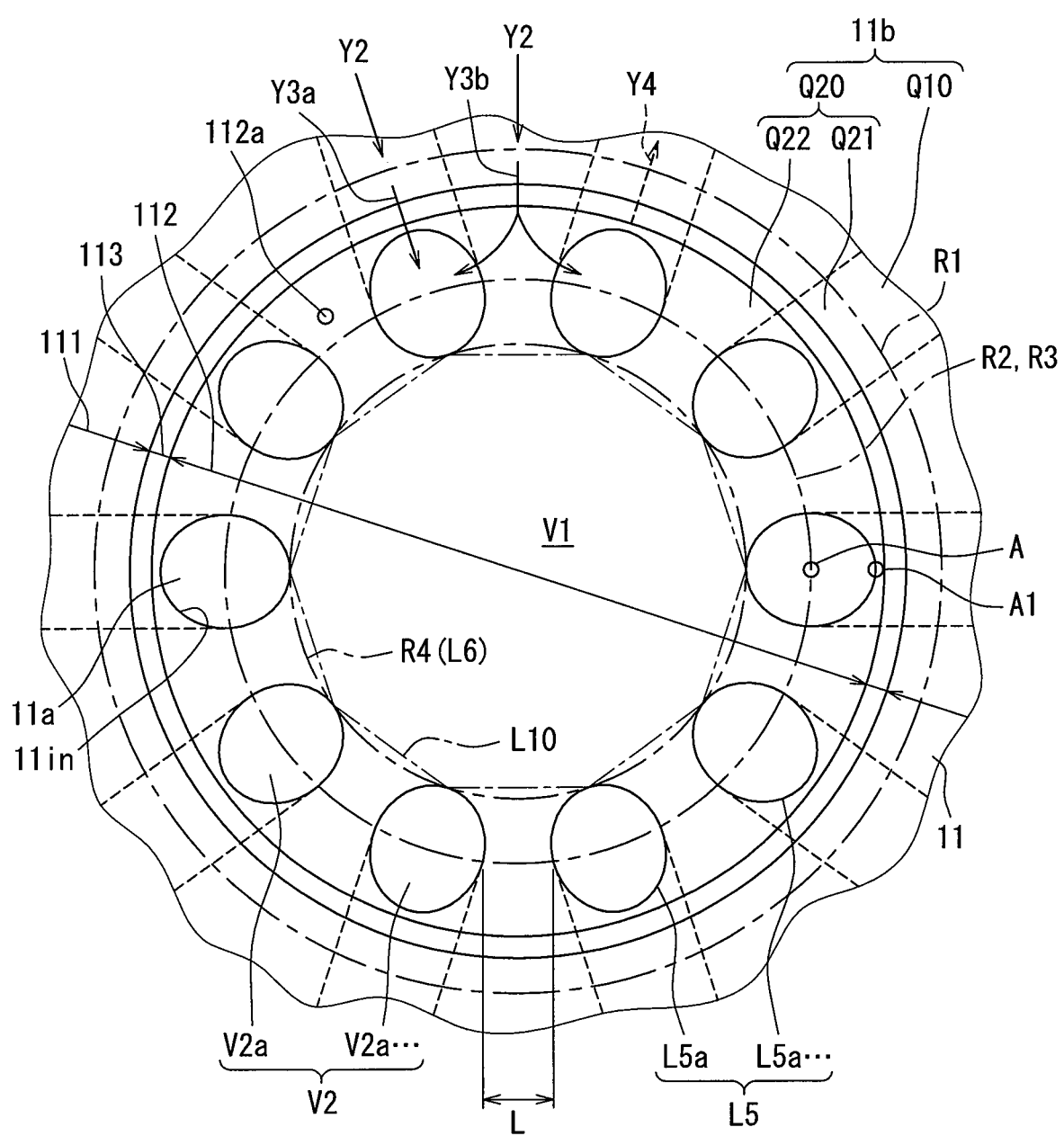
FIG. 7 is a top view viewed from the side of the inflow port of the injection hole and showing the injection hole body according to the first embodiment.

As shown in FIG. 7, the shapes of the inflow ports 11in and the outflow ports 11out are elliptical shapes in each of which a major axis line is along the radial direction about the axis line C1. As shown in FIG. 8, an inflow port center point A is a point which is an elliptical center of the inflow port 11in and is in the axis line C2. The elliptical center is a point at which the long side and the short side of the ellipse intersect with each other. An inflow center facing point B is a point where a line parallel to the axis line C1 passing through the inflow port center point A intersects with an outer surface of the needle 20. As shown in FIG. 7, a circle passing through the inflow port center point A of the multiple injection holes 11a corresponds to the inflow central virtual circle R2 described above. A facing virtual circle R3 is a circle connecting the multiple inflow center facing points B. When viewed along the direction of the axis line C1, the inflow central virtual circle R2 and the facing virtual circle R3 coincide with each other.

As shown in FIG. 7, among the multiple injection holes 11a placed around the axis line C1, an inter-injection hole distance L is the distance between the inflow ports 11in of the injection holes 11a adjacent to each other. The inter-injection hole distance L is a length along the inflow central virtual circle R2. As shown in FIGS. 8 and 9, a needle separation distance Ha is a distance between the needle 20 and the injection hole body 11 in the direction in which the needle 20 is unseated and seated, that is, in the direction of the axis line C1. An inflow port gap distance H is a size of the gap between the outer surface of the needle 20 and the inflow port 11in. In other words, the needle separation distance Ha at the portion of the inflow port 11in, more specifically, the needle separation distance Ha at the portion of the inflow port 11 in farthest from the axis line C1, that is, the portion indicated by a reference numeral A1 in FIGS. 7 and 8, corresponds to the inflow port gap distance H. The inter-injection hole distance L defined as the length between the injection holes along the inflow central virtual circle R2 is smaller than the inflow port gap distance H. In addition to that, a second inter-injection hole distance described below is also smaller than the inflow port gap distance H. The second inter-injection hole distance is defined as a shortest straight line length between the outer peripheral edges of the inflow ports 11 in adjacent to each other.

The inter-injection hole distance L is smaller than the inflow port gap distance H defined as the needle separation distance Ha at the position indicated by the reference numeral A1. In addition to that, the inter-injection hole distance L is smaller than a second inflow port gap distance. The second inflow port gap distance will be described below. The second inflow port gap distance is defined as the needle separation distance Ha at the inflow port center point A. Further, the second inter-injection hole distance is set to be smaller than the second inflow port gap distance.

The inter-injection hole distance L is smaller than the inflow port gap distance H. More specifically, the inter-injection hole distance L is smaller than the inflow port gap distance H in a state in which the needle 20 is unseated from the seating surface 11s and is at the position farthest from the seating surface 11s, that is, the needle 20 is in a maximum valve open position (full lift position). The maximum valve open position is a position of the needle 20 in the direction of the axis line C1 in a state where the inner core 32 is in contact with the stopper abutment end face 61*a* and where the valve-opening-state valve body abutment surface 21*a* is in contact with the inner core 32.

Figure 10:
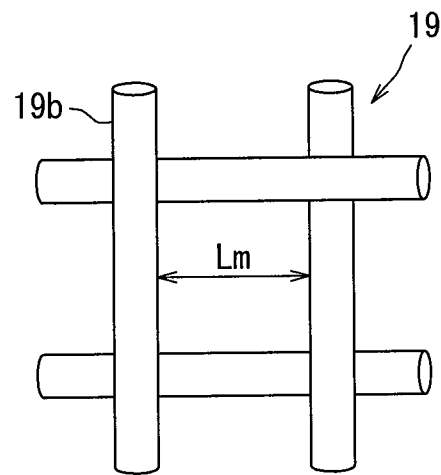
FIG. 10 is a schematic view showing a filter and for illustrating a mesh interval according to the first embodiment.
Figure 11:
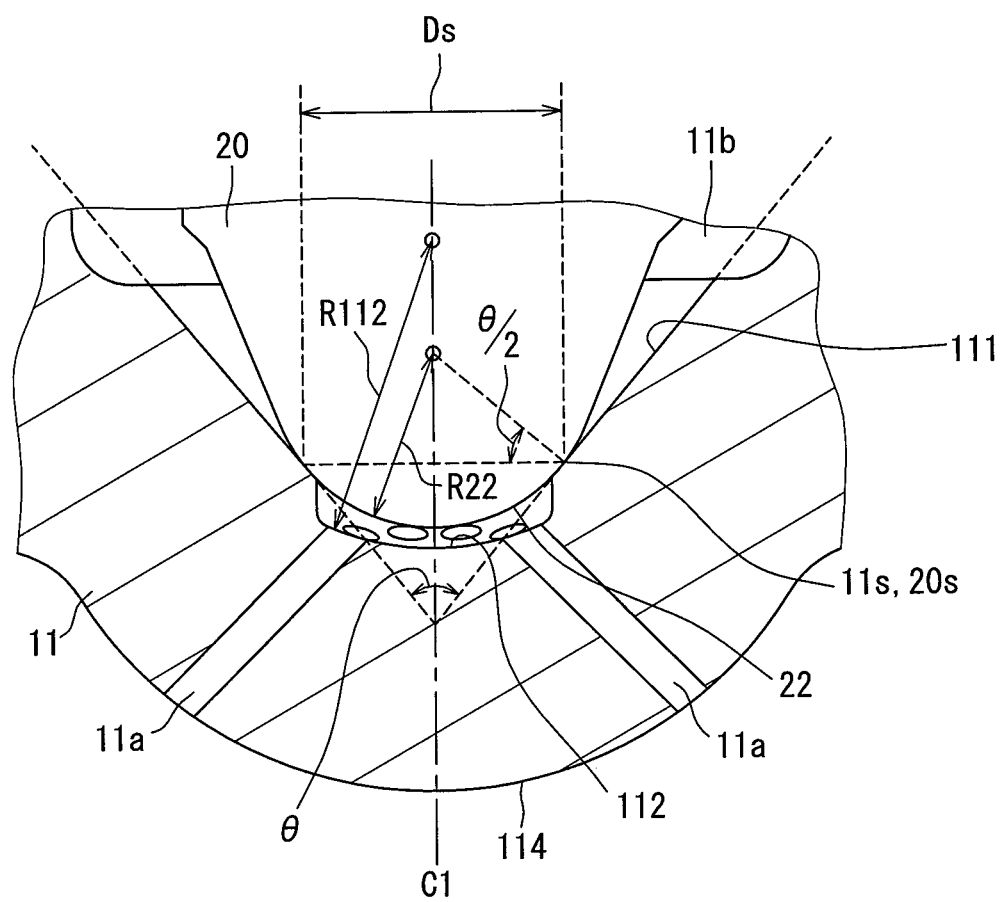
FIG. 11 is a cross-sectional view showing a state in which the needle is closed and for illustrating a seat angle, according to the first embodiment.

Further, the inter-injection hole distance L is smaller than the inflow port gap distance H in the state in which the needle 20 is seated on the seating surface 11*s*, that is, in the valve closed state. The inflow port gap distance H in the closed state is larger than the mesh interval Lm of the filter 19. As shown in FIG. 10, the filter 19 is formed by weaving multiple wire rods 19*b*. The mesh interval Lm is the shortest distance between the wire rods 19*b* adjacent to each other. The inter-injection hole distance L is smaller than a diameter of the inflow port 11*in*. In a case where the inflow port 11*in* is an ellipse, a short side of the ellipse is regarded as the diameter of the inflow port 11 in.

In the fuel passage 11*b* formed between the inner surface of the injection hole body 11 and the outer surface of the needle 20, a seat upstream passage Q10 is a portion on the upstream side of the seating surface 11*s* and the seat surface 20*s*, and a seat downstream passage Q20 is a portion on the downstream side of the seating surface 11*s* and the seat surface 20*s*. The seat downstream passage Q20 has a tapered chamber Q21 and the sac chamber Q22.

As shown in FIG. 8, in the inner surface of the injection hole body 11, the tapered surface 111 includes the seating surface 11*s*, forms a part of the seat upstream passage Q10, and further forms the entirety of the tapered chamber Q21. The tapered surface 111 is in a linear shape and is in a shape extending in a direction intersecting with the axis line C1 in a cross section including the axis line C1. The tapered surface 111 is in an annular shape when viewed along the direction of the axis line C1 (refer to FIG. 7).

The body bottom surface 112 is a portion of the inner surface of the injection hole body 11 including the axis line C1 and forming the sac chamber Q22. A coupling surface 113 is a portion of the inner surface of the injection hole body 11 connecting the body bottom surface 112 with the tapered surface 111. The coupling surface 113 is in a linear shape and is in a shape extending in a direction intersecting with the axis line C1 in the cross section including the axis line C1. The coupling surface 113 is in an annular shape when viewed along the direction of the axis line C1 (refer to FIG. 7). Strictly speaking, a boundary between the coupling surface 113 and the tapered surface 111 and a boundary between the coupling surface 113 and the body bottom surface 112 are curved in the cross section including the axis line C1.

The valve body tip end face 22 is a surface in the outer surface of the needle 20 including the seat surface 20*s* and a portion on the downstream side of the seat surface 20*s*. The needle separation distance Ha is the distance between the valve body tip end face 22 and the injection hole body 11 in the direction in which the needle 20 is unseated and seated, specifically, is the distance between the body bottom surface 112 and the valve body tip end face 22 in the direction of the axis line C1.

The valve body tip end face 22 is in a shape curved in a direction to swell toward the side of the body bottom surface 112. A radius of curvature R22 of the valve body tip end face 22 (refer to FIG. 11) is the same throughout the valve body tip end face 22. The radius of curvature R22 is smaller than a seat diameter Ds, which is a diameter of the seat surface 20*s* at the seat position R1, and is larger than the seat radius.

The body bottom surface 112 is in a shape curved and concaved in a direction toward the valve body tip end face 22, that is, the body bottom surface 112 is in a shape curved in the same direction as that of the valve body tip end face 22. A radius of curvature R112 of the body bottom surface 112 (refer to FIG. 11) is the same throughout the body bottom surface 112. The radius of curvature R112 of the body bottom surface 112 is larger than the radius of curvature R22 of the valve body tip end face 22. Therefore, the needle separation distance Ha continuously decreases in the direction along the radial direction from a peripheral edge of the inflow central virtual circle R2 toward the axis line C1.

Figure 12:
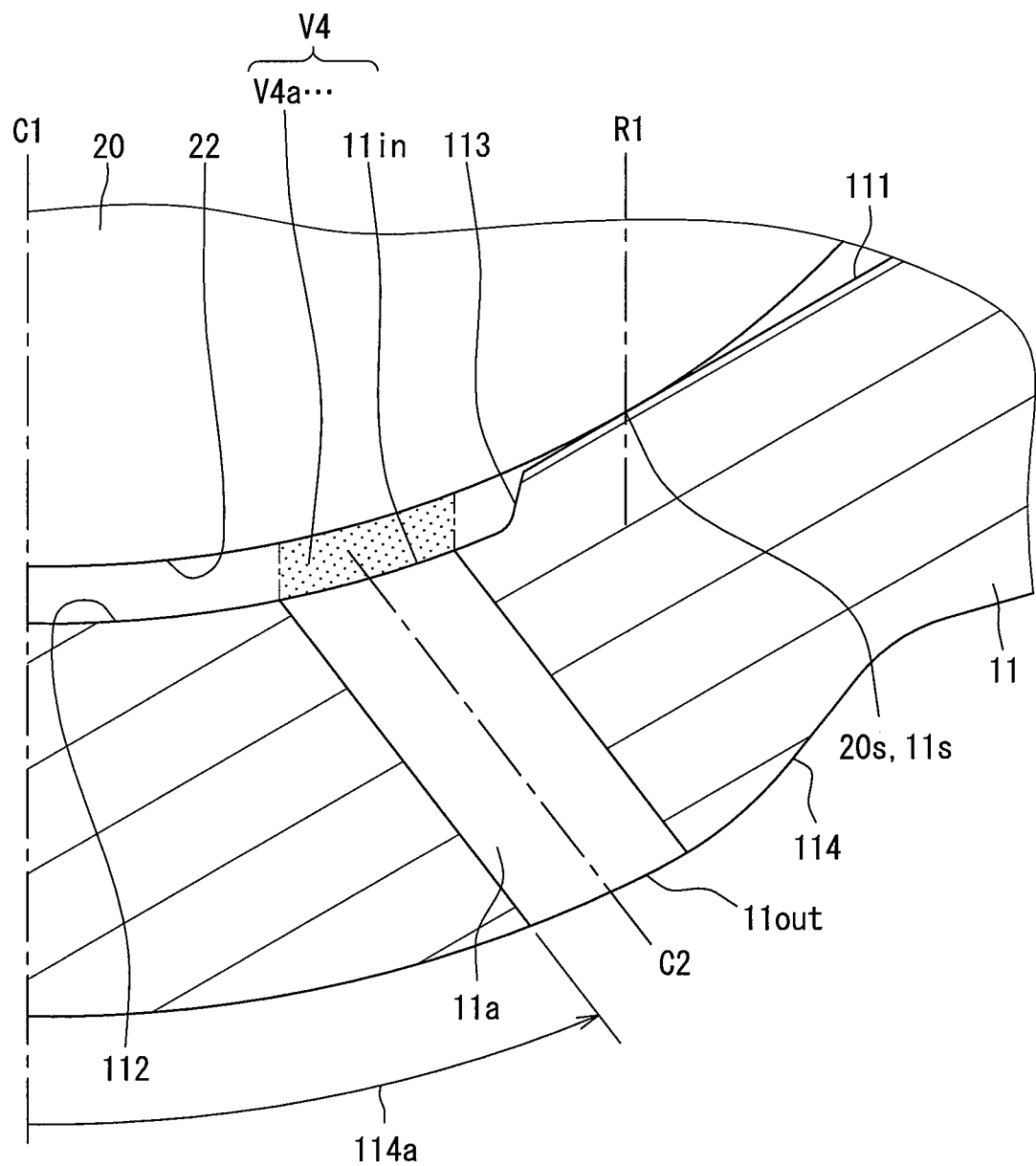
FIG. 12 is a cross-sectional view showing the injection hole body and the needle and for illustrating a volume directly above the injection hole, according to the first embodiment.

In a body outer surface 114 which is an outer surface of the injection hole body 11, an outer surface center region 114*a* is a region of a portion closer to the axis line C1 in the radial direction than the outflow port 11*out* (refer to FIG. 12). The outer surface center region 114*a* is in a shape curved in the same direction as that of the body bottom surface 112. The radius of curvature of the outer surface center region 114*a* is the same throughout the outer surface center region 114*a*. The radius of curvature of the outer surface center region 114*a* is larger than the radius of curvature R112 of the body bottom surface 112. A thickness of the body outer surface 114 is uniform in the outer surface center region 114*a*. That is, a length of the body outer surface 114 in the direction along the radial direction of curvature is uniform in the outer surface center region 114*a*.

A surface roughness of a portion of the injection hole body 11 which forms the fuel passage 11*b* is rougher than a surface roughness of portions of the injection hole body 11 which forms the injection holes 11*a*. More specifically, the surface roughness of the body bottom surface 112 is rougher than the surface roughness of the inner wall surfaces of the injection holes 11*a*. The injection holes 11*a* are formed by laser machining. To the contrary, the inner surface of the injection hole body 11 is formed by cutting.

A virtual circle is in contact with portions of the peripheral edges of the multiple inflow ports 11, which are closest to the axis line C1 in the radial direction. The virtual circle is centered on the axis line C1. A virtual cylinder is formed by extending the virtual circle straight from the body bottom surface 112 toward the valve body tip end face 22 along the direction of the axis line C1. A central cylindrical volume V1*a* is a volume of a portion of the fuel passage 11*b* surrounded by the virtual cylinder, the body bottom surface 112, and the valve body tip end face 22 (refer to FIG. 7). In addition, a virtual region is a region surrounded by straight lines each connecting portions of the peripheral edges of the multiple inflow ports 11*in* closest to the axis line C1 in the radial direction. A center volume V1 is a volume formed by extending the virtual region from the injection hole body 11 toward the needle 20 along the direction of the axis line C1. Both the central cylindrical volume V1*a* and the center volume V1 do not include a volume V2*a* of the injection holes 11*a*.

The virtual circle according to the present embodiment is a virtual inscribed circle R4 inscribed in the multiple inflow ports 11*in*. In addition, a seat downstream volume V3 is a volume of all portions of the fuel passage 11*b* on the downstream side of the seating surface 11*s*, that is, a volume of the seat downstream passage Q20 (refer to FIG. 8). As described above, the seat downstream passage Q20 has the tapered chamber Q21 and the sac chamber Q22. Therefore, a volume of all portions of the fuel passage 11*b* on the downstream side of the seating surface 11*s* is a volume of a combination of the volume of the tapered chamber Q21 and the volume of the sac chamber Q22. The center volume V1, the central cylindrical volume V1$a$, and the seat downstream volume V3 change according to the lift amount L2 of the needle 20 and become maximum when the lift amount L2 is maximum.

A total injection hole volume V2 is a total of the volumes V2$a$ of the multiple injection holes 11$a$. In the present embodiment, ten injection holes 11$a$ are formed, and the volumes V2$a$ of all the injection holes 11$a$ are the same. Therefore, a value 10 times as large as the volume V2$a$ of one injection hole 11$a$ coincides with the total injection hole volume V2. The volume V2$a$ of the injection hole 11$a$ corresponds to a volume of the region between the inflow port 11$in$ and the outflow port 11 out of the injection hole 11$a$. The volume V2$a$ of the injection hole 11$a$ may be calculated from a tomographic image of the injection hole body 11 obtained by irradiating X-rays, for example. Similarly, other volumes defined in the present embodiment may be calculated from the tomographic image.

The total injection hole volume V2 is larger than the center volume V1 in the state in which the needle 20 is seated on the seating surface 11$s$ and is larger than the center volume V1 in the state in which the needle 20 is farthest from the seating surface 11$s$ (that is, in the full lift state). In addition, the total injection hole volume V2 is larger than the seat downstream volume V3 in the seated state and larger than the seat downstream volume V3 in the full lift state. Similarly to the center volume V1, the central cylindrical volume V1$a$ is smaller than the total injection hole volume V2 in both of the full lift state and the seated state.

A dotted portion in FIG. 12 corresponds to a columnar space (a region directly above the injection hole) in the fuel passage 11$b$ extending straight from the inflow port 11$in$ along the direction of the axis line C1. In the fuel passage 11$b$, a volume directly above the injection hole V4$a$ is a volume in the region directly above each injection hole. A total volume directly above an injection holes V4 is a total of the volumes directly above the injection holes V4$a$ of the multiple injection holes 11$a$. The total volume directly above the injection holes V4 is larger than the center volume V1. The central cylindrical volume V1$a$ is also smaller than the total volume directly above the injection holes V4 in the same manner as the center volume V1.

A total peripheral length L5 is a total of peripheral lengths L5$a$ of the inflow ports 11$in$ of the multiple injection holes 11$a$ (refer to FIG. 7). In the present embodiment, ten injection holes 11$a$ are provided, and the peripheral lengths L5$a$ of all the injection holes 11$a$ are substantially the same. Therefore, a value ten times as large as the peripheral length L5$a$ of one injection hole 11$a$ coincides with the total peripheral length L5. A virtual circle is in contact with the portions of the circumferential edges of the multiple inflow ports 11 in closest to the axis line C1 in the radial direction and is centered on the axis line C1. A virtual peripheral length L6 is the peripheral length of the virtual circle. That is, the virtual peripheral length L6 is the peripheral length of the virtual inscribed circle R4 described above. The total peripheral length L5 is larger than the virtual peripheral length L6.

A tangential direction of the valve body tip end face 22 at the seat position R1 is the same as a tangential direction of the tapered surface 111 at the seat position R1. The valve body tip end face 22 is in a curved shape in the cross section including the axis line C1. To the contrary, the tapered surface 111 is in a linear shape in the cross section including the axis line C1. A seat angle $\theta$ is an apex angle at an apex where extension lines of the tapered surface 111 intersect with each other (refer to FIG. 11). In other words, the seating surface 11$s$ is a conical surface represented by the two straight lines in the cross section. An angle formed by those two straight lines is the seat angle $\theta$. The seat angle $\theta$ is set to an angle of 90 degrees or less, more specifically, an angle smaller than 90 degrees. In the cross section including the axis line C1, the intersection angle between the tapered surface 111 and the axis line C1 is half ($\theta/2$) of the seat angle $\theta$. This intersection angle is larger than an intersection angle between the coupling surface 113 and the axis line C1 in the cross section including the axis line C1.

Operation Effect

When the needle 20 is lifted down and seated on the seating surface 11$s$, the fuel still remains in the seat downstream passage Q20, and the remaining fuel flows out of the injection holes 11$a$ immediately after the seating. More specifically, a fuel flow velocity in each injection hole 11$a$ at the time of seating does not immediately become zero. The fuel continues to flow due to inertia immediately after the valve has been closed. The fuel in the seat downstream passage Q20 is attracted to the fuel flowing through the injection hole 11$a$ by inertia. More specifically, in the sac chamber Q22, the flow velocity of the fuel existing in the volume directly above an injection hole V4$a$ is high, and the fuel existing around the volume directly above the injection hole V4$a$ is attracted to the flow of the fuel (main flow). The fuel thus attracted is jetted from the injection hole 11$a$ at a high flow velocity. Therefore, the fuel thus jetted hardly adheres to the body outer surface 114 of the body.

However, as time elapses from a time of seating, a force of fuel ejection is weakened. A fuel leaking from the outflow port 11$out$ due to its own weight tends to adhere to the portion of the body outer surface 114 around the outflow port 11$out$. The leaked fuel adhering to the body outer surface 114 of the body tends to be altered due to a heat in the combustion chamber to develop as a deposit. When such a deposit accumulates and develops, a spray shape and the injection amount of the fuel injected from the injection hole 11$a$ vary relative to those in an intended state.

In view of the above concern, by reducing the volume of the seat downstream passage Q20 to reduce the inflow port gap distance H, the amount of the fuel to be leaked can be reduced. Consequently, the leak amount can be reduced, so that deposit development can be reduced.

On the other hand, the flow directions of the fuel in the seat upstream passage Q10 and the fuel in the tapered chamber Q21 are largely different from the flow direction of the fuel in the injection holes 11$a$. Therefore, the flow direction of the fuel changes (bends) abruptly when the fuel flows from the sac chamber Q22 into the inflow ports 11$in$. Assuming that the inflow port gap distance H is reduced in order to reduce the leak amount, the abrupt change (bending) in the flow direction is promoted. Consequently, an increase in a pressure loss is promoted. In other words, a reduction in the inflow port gap distance H in order to reduce the fuel leakage amount causes a conflict to a reduction in the pressure loss.

In this example, as described above, the fuel that passes around the seat position R1 and flows into the seat downstream passage Q20 changes its fuel direction to the direction indicated by the arrow Y3 in FIGS. 6 and 7, and the fuel flows into the inflow ports 11$in$. As described above, the fuel flowing into the seat downstream passage Q20 may be roughly classified into a longitudinal inflow fuel Y3$a$ and a lateral inflow fuel Y3$b$ shown in FIG. 7. The longitudinal inflow fuel Y3$a$ flows from the seating surface 11$s$ toward the inflow port 11*in* via the shortest distance. The lateral inflow fuel Y3*b* flows from the seating surface 11*s* toward the portion (inter-injection hole portion 112*a*) between the two adjacent inflow ports 11*in* of the injection holes 11*a*. The lateral inflow fuel Y3*b* subsequently flows by changing the direction from the direction toward the inter-injection hole portion 112*a* to the direction toward the inflow port 11*in*.

In both of the longitudinal inflow fuel Y3*a* and the lateral inflow fuel Y3*b*, the pressure loss increases as the inflow port gap distance H decreases in order to reduce the volume of the seat downstream passage Q20. As for the lateral inflow fuel Y3*b*, the increase in the pressure loss may be mitigated by reducing the inter-injection hole distance L. Therefore, an increase in the pressure loss due to the reduction in the inflow port gap distance H may be mitigated by reducing the inter-injection hole distance L.

Figure 13:
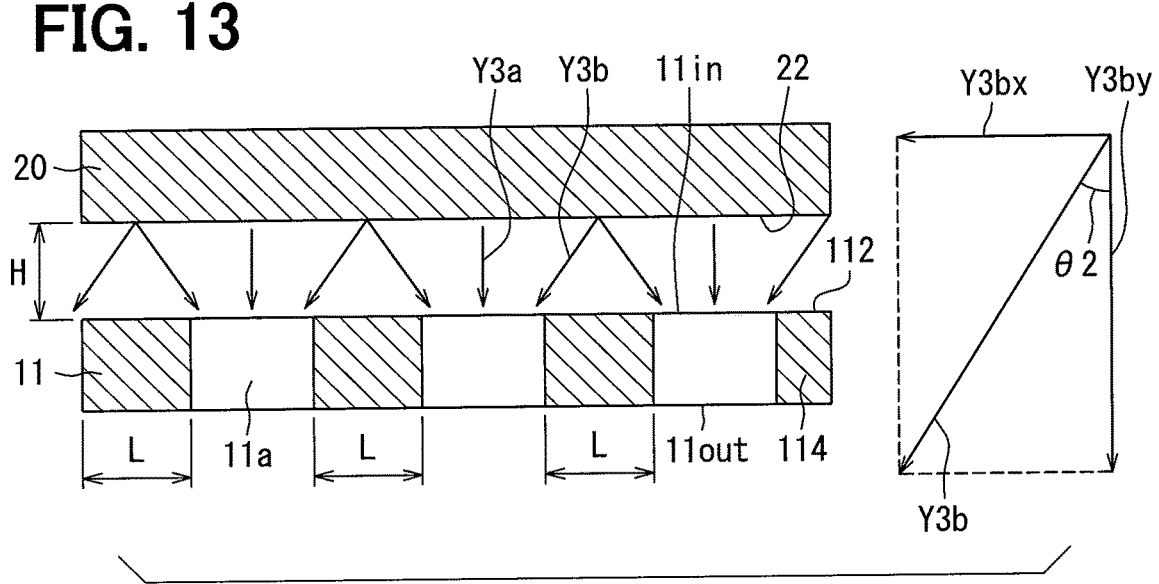
FIG. 13 is a cross-sectional view schematically showing an injection hole body and a needle included in a fuel injection valve and for illustrating an inflow angle of a lateral inflow fuel according to a first comparative example.
Figure 14:
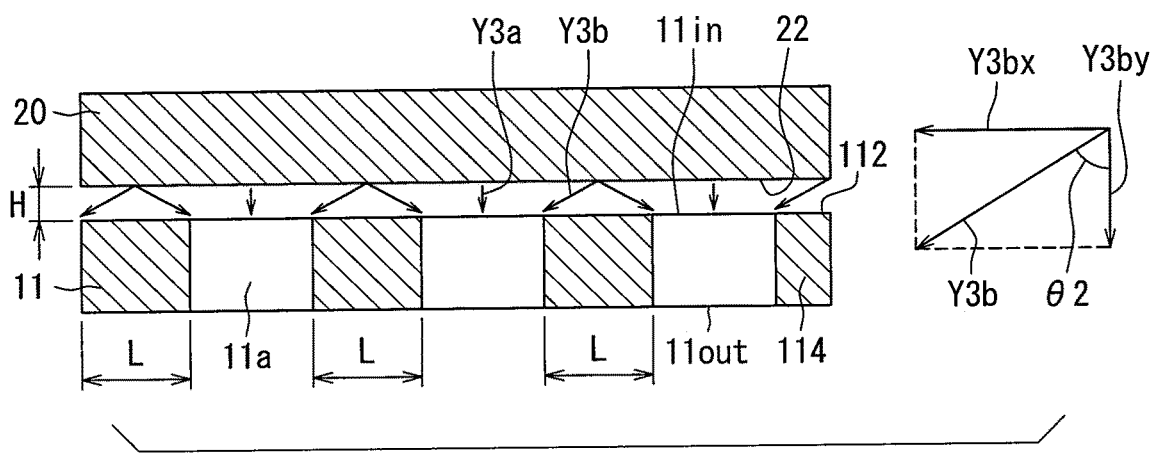
FIG. 14 is a cross-sectional view schematically showing an injection hole body and a needle included in a fuel injection valve and for illustrating an inflow angle of a lateral inflow fuel according to a second comparative example.
Figure 15:
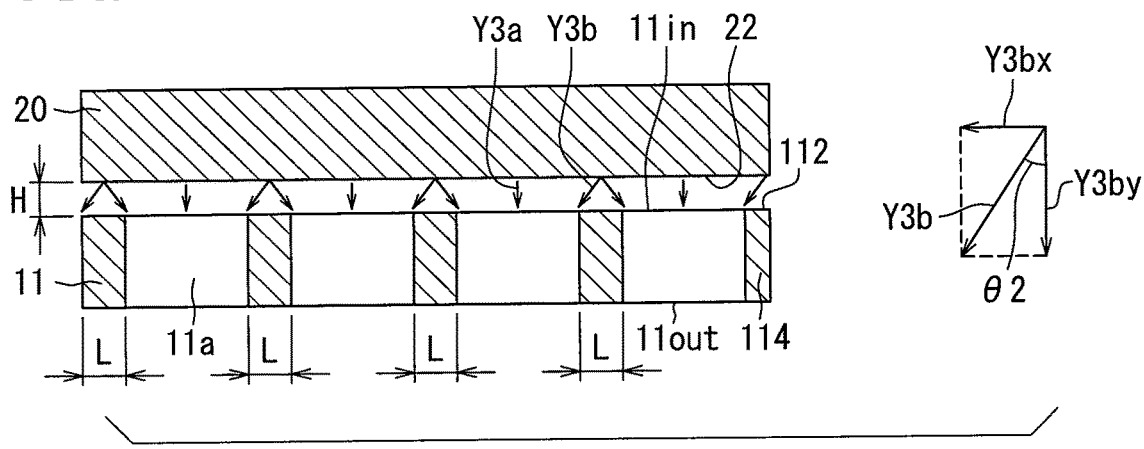
FIG. 15 is a cross-sectional view schematically showing the injection hole body and the needle included in the fuel injection valve and for illustrating an inflow angle of a lateral inflow fuel according to the first embodiment.

The mitigation will be described in detail with reference to FIGS. 13 to 15. FIGS. 13 to 15 are schematic views showing cross sections of the injection hole body 11 and the needle 20 taken along a curved surface. The curved surface is parallel to the axis line C1 and includes the inflow central virtual circle R2 and the facing virtual circle R3. Arrows in FIGS. 13 to 15 show the flow directions of the fuel in the valve open state. In a first comparative example shown in FIG. 13, the inflow port gap distance H is larger than that in the present embodiment. Therefore, the volume of the seat downstream passage Q20 is larger, and the amount of fuel leaked from the injection holes 11*a* immediately after the valve has been closed is larger. In a second comparative example shown in FIG. 14, the inflow port gap distance H is reduced as compared with the first comparative example. As a result, the volume of the seat downstream passage Q20 is reduced, and the amount of fuel leakage immediately after the valve has been closed can be reduced as compared with the first comparative example.

A vector shown in a right column of the figure represents a flow velocity of the lateral inflow fuel Y3*b* as a vector. The flow velocity vector of the lateral inflow fuel Y3*b* may be decomposed into a lateral component Y3*bx* which is a component perpendicular to the axis line C1 and a longitudinal component Y3*by* which is a component parallel to the axis line C1. An inflow angle θ2 is an angle of the flow velocity vector of the lateral inflow fuel Y3*b* with respect to the axis line C1. The larger a ratio of the longitudinal component Y3*by* to the lateral component Y3*bx* is, the smaller the inflow angle θ2 is. As shown in the right column of FIG. 14, the fuel leakage amount may be reduced by reducing only the inflow port gap distance H, however, the inflow angle θ2 becomes larger, and therefore, the pressure loss becomes large.

In the present embodiment focused on the above issues, as shown in FIG. 15, the inflow port gap distance H is set to be smaller than that of the first comparative example, and the inter-injection hole distance L is set to be smaller than the inflow port gap distance H. The inflow port gap distance H according to the first comparative example is the same as the inter-injection hole distance L. The inflow port gap distance H according to the second comparative example is smaller than the inter-injection hole distance L.

As described above, according to the present embodiment, the inter-injection hole distance L is smaller than the inflow port gap distance H. Therefore, the pressure loss of the lateral inflow fuel Y3*b* can be mitigated as compared with the case in which the inter-injection hole distance L is larger than the inflow port gap distance H. Therefore, the increase in the pressure loss caused by reducing the inflow port gap distance H can be mitigated while reducing the volume of the seat downstream passage Q20 by reducing the inflow port gap distance H. That is, the present embodiment enables to achieve both of the reduction in the fuel leakage amount by reducing the volume of the seat downstream passage Q20 and the reduction in the pressure loss by reducing the inter-injection hole distance L.

In addition, as the pressure loss is reduced as described above, the flow velocity of the fuel flowing from the sac chamber Q22 into the injection holes 11*a* increases. This configuration enables to restrict foreign matter contained in the fuel from staying in the sac chamber Q22 and to enhance a property for discharging foreign matter from the injection holes 11*a*. In addition, the residual fuel can be reduced by reducing the volume of the seat downstream passage Q20. Therefore, a property for discharging the residual fuel can be enhanced with the reduction in the pressure loss by reducing the inter-injection hole distance L.

Further, according to the present embodiment, the inter-injection hole distance L is smaller than the inflow port gap distance H in the state in which the needle 20 is seated on the seating surface 11*s*. For that reason, in the seated state, the inflow angle θ2 of the lateral inflow fuel Y3*b* becomes smaller than that in the case where the inter-injection hole distance L is larger than the inflow port gap distance H. Therefore, the effect of mitigating the increase in the pressure loss of the lateral inflow fuel Y3*b* can be promoted.

Further, according to the present embodiment, the virtual circle that is in contact with the portions of the peripheral edges of the multiple inflow ports 11*in* closest to the axis line C1 and that is centered on the axis line C1 is of the virtual cylinder that extends straight from the inflow port 11*in* toward the needle 20 along the direction of the axis line C1. The volume of the space surrounded by the virtual cylinder in the fuel passage 11*b* is defined as the center volume V1. The total volume of the multiple injection holes 11*a* is defined as the total injection hole volume V2. The total injection hole volume V2 is set to be larger than the center volume V1.

For that reason, a flow rate of the main flow can be increased as compared with the case where the total injection hole volume V2 is set to be smaller than the center volume V1. In addition, the amount of fuel that is hardly attracted to the main flow can be reduced as compared with the case where the total injection hole volume V2 is set to be smaller than the center volume V1. As a result, the configuration enables to reduce the residual fuel that cannot be jetted out of the injection holes 11*a* rapidly at a high flow velocity together with the main flow. Therefore, the fuel adhering to the outer body surface 114 and the inner surface of the injection hole 11*a* can be reduced. In addition, the deposit can be restricted from being developed on the body outer surface 114.

Further, according to the present embodiment, the total injection hole volume V2 is set to be larger than the center volume V1 in the state in which the needle 20 is unseated from the seating surface 11*s* and is at the position farthest away in the movable range of the needle 20, that is, the needle 20 is at the full lift position. For that reason, as compared with the case where the total injection hole volume V2 is set to be smaller than the center volume V1 in the full lift state, the flow rate of the main flow can be further increased. In addition, the amount of fuel which is hardly attracted to the main flow can be further reduced. Thus, the property for discharging the residual fuel can be further enhanced.

Further, according to the present embodiment, the total injection hole volume V2 is set to be larger than the seat downstream volume V3 in the valve closed state. For that reason, as compared with the case where the total injection hole volume V2 is set to be smaller than the seat downstream volume V3, the flow rate of the main flow can be further increased. In addition, the amount of fuel which is hardly attracted to the main flow can be further reduced. Thus, the property for discharging the residual fuel can be further enhanced.

Further, according to the present embodiment, the total injection hole volume V2 is set to be larger than the seat downstream volume V3 in the state in which the needle 20 is unseated from the seating surface 11s and is at the position farthest away in the movable range of the needle 20, that is, the needle 20 is at the full lift position. For that reason, as compared with the case in which the total injection hole volume V2 is set to be smaller than the seat downstream volume V3 in the full lift state, the flow rate of the main flow can be further increased. In addition, the amount of fuel which is hardly attracted to the main flow can be further reduced. Thus, the property for discharging the residual fuel can be further enhanced.

Further, according to the present embodiment, the total volume directly above the injection holes V4, which is the total volume of the volumes directly above the injection holes V4a, is set to be larger than the center volume V1 in the state in which the needle 20 is seated on the seating surface 11s, that is, in the valve closed state. For that reason, as compared with the case where the total volume directly above the injection holes V4 is set to be smaller than the center volume V1 in the valve closed state, the flow rate of the main flow can be further increased. Therefore, the amount of fuel which is hardly attracted to the main flow can be further reduced. Thus, the property for discharging the residual fuel can be enhanced.

Further, according to the present embodiment, the total of the peripheral lengths L5a of the multiple inflow ports 11in is defined as the total peripheral length L5. The virtual circle is in contact with the portions of the peripheral edges of the multiple inflow ports 11in which are closest to the axis line C1. The virtual circle is centered on the axis line C1. The peripheral length of the virtual circle is defined as the virtual peripheral length L6. The total peripheral length L5 is set to be larger than the virtual peripheral length L6. For that reason, as compared with the case in which the total peripheral length L5 is set to be smaller than the virtual peripheral length L6, the flow rate of the main flow can be further increased. Therefore, the amount of fuel which is hardly attracted to the main flow can be further reduced. Thus, the property for discharging the residual fuel can be enhanced.

Further, according to the present embodiment, the seat surface 20s of the outer surface of the needle 20 is a portion to be unseated from and seated on the seating surface 11s. The entirety of the seat surface 20s and a portion of the outer surface of the needle 20, which is on the fuel flow downstream side of the seat surface 20s, is defined as the valve body tip end face 22. The distance between the valve body tip end face 22 and the injection hole body 11 in the direction of the axis line C1 is defined as the needle separation distance Ha (valve body separation distance). The circle passing through the centers of the inflow ports 11in and centering on the axis line C1 is defined as the inflow central virtual circle R2. The valve body tip end face 22 is curved in the direction to swell toward the injection hole body 11. The needle separation distance Ha continuously decreases from the peripheral edge of the inflow central virtual circle toward the axis line C1 in the radial direction.

For that reason, the fuel in the portion of the seat downstream passage Q20 closer to the axis line C1 is more likely to be attracted to the inflow port 11in, as compared with a case in which the needle separation distance Ha is uniform regardless of the position relative to the axis line C1 or as compared with a case in which the needle separation distance Ha becomes larger toward the axis line C1, contrary to the above configuration. Therefore, the configuration enables to reduce the residual fuel that cannot be jetted out from the injection hole 11a rapidly at a high flow velocity together with the main flow. Therefore, the fuel that adheres to the outer surface of the injection hole body 11 and the fuel that adheres to the inner surface of the injection hole 11a can be reduced. Thus, the deposit can be restricted from developing on the injection hole body 11.

Further, according to the present embodiment, the surface of the injection hole body 11 which faces the valve body tip end face 22 and includes at least the axis line C1 is defined as the body bottom surface 112. The body bottom surface 112 is curved in the same direction as the direction in which the valve body tip end face 22 is curved.

Further, according to the present embodiment, the radius of curvature R112 of the body bottom surface 112 is larger than the radius of curvature R22 of the valve body tip end face 22. For that reason, in the configuration in which the needle separation distance Ha is continuously reduced, the needle separation distance Ha can be restricted from rapidly decreasing, thereby to promote the gradual decrease. This configuration enables to promote to cause the fuel in the portion of the seat downstream passage Q20 close to the axis line C1 to be easily attracted toward the inflow port 11in.

Further, according to the present embodiment, the region of the outer surface of the injection hole body 11, which includes at least the portion between the outflow port 11out and the axis line C1, is defined as the outer surface center region 114a. The outer surface center region 114a is curved in the same direction as the direction in which the valve body tip end face 22 is curved. The radius of curvature of the outer surface center region 114a is larger than the radius of curvature of the body bottom surface 112 under the condition that the center of the radius of curvature is located at the same position. Contrary to the above configuration, assuming a case where both of the radii of curvature are the same, the farther the position from the axis line C1 is, the thinner the thickness of the injection hole body 11 on the body outer surface 114 is. To the contrary, in the present embodiment, the outer surface center region 114a is curved in the manner as described above. Therefore, the configuration enables to restrict the unevenness of the wall thickness of the injection hole body 11.

Further, according to the present embodiment, the first spring member SP1 exhibiting the resilient force for urging the needle 20 against the seating surface 11s is provided. The seat angle θ, which is an angle between the two straight lines appearing in the cross section of the seating surface 11s including the axis line C1, is 90 degrees or less. For that reason, the configuration enables to restrict the needle 20 from bouncing toward the valve opening side. Therefore, the bouncing of the needle 20 can be reduced.

Further, according to the present embodiment, the multiple injection holes 11a are placed at equal intervals on the concentric circle about the axis line C1 when viewed along the direction of the axis line C1. In other words, the inter-injection hole distances L are equal for all of the injection holes 11a. For that reason, the configuration enables to promote the uniform fuel flow into all the injection holes 11a. Therefore, the pressure loss caused when the fuel flows from the sac chamber Q22 into the inflow ports 11 in can be reduced.

Further, according to the present embodiment, the inter-injection hole distance L is smaller than the diameter (short side length) of the inflow ports 11in. For that reason, the inflow angle θ2 of the lateral inflow fuel Y3b becomes smaller than that in a case in which the inter-injection hole distance L is larger than the diameter of the inflow ports 11in. Therefore, the configuration enables to promote the effect of reducing the increase in the pressure loss of the lateral inflow fuel Y3b.

Further, according to the present embodiment, the filter 19 that captures foreign matter contained in the fuel flowing into the fuel passage 11b is provided. The diameter of a portion of the injection hole 11a, at which its passage cross-sectional area is minimum, is larger than the mesh interval Lm of the filter 19. The passage cross-sectional area is an area of a cross section taken perpendicular to the axis line C2. According to the above configuration, the foreign matter that has passed through the filter 19 is likely smaller than the mesh interval Lm. The diameter of the injection hole 11a is larger than the mesh interval Lm, and therefore, a concern that the foreign matter would clog the injection hole 11a can be reduced.

According to the present embodiment, the surface roughness of the portion of the injection hole body 11 forming the fuel passage 11b is rougher than the surface roughness of the portion forming the inner wall surface of the injection hole 11a. For that reason, a pressure loss of the fuel flowing through the injection hole 11a can be reduced and the flow velocity can be increased as compared with the case where both of the fuel passage 11b and the injection hole 11a are set to have the same surface roughness. In the configuration, the fuel existing in the volume directly above the injection hole V4a flows thereby to enable to accelerate the main flow in the sac chamber Q22. Thus, the operation for attracting the fuel around the main flow toward the main flow can be enhanced. This configuration enables to enhance the property for discharging the residual fuel. Therefore, the fuel in the sac chamber Q22 can be discharged rapidly immediately after the valve has been closed. Thus, the property for discharging the foreign matter staying in the sac chamber Q22 can be promoted.

Further, the fuel injection system according to the present embodiment includes the control device 90 that controls the fuel injection state from the injection holes 11a by controlling the state in which the needle 20 is unseated from and seated on the seating surface 11s. The fuel injection system further includes the fuel injection valve 1. The control device 90 includes the multi-stage injection control unit 91 that controls the fuel injection valve 1 so as to inject the fuel from the injection hole 11a for multiple times in one combustion cycle of the internal combustion engine. In the configuration of the multi-stage injection, the number of leakage of fuel occurring in one combustion cycle increases. In addition, the injection pressure decreases in each injection. Therefore, the leaked fuel tends to adhere to the body outer surface 114, and deposits tend to accumulate. According to the present embodiment, the configuration, in which the inter-injection hole distance L is set to be smaller than the inflow port gap distance H, is employed in the fuel injection system that performs multi-stage injection. Therefore, the configuration enables to suitably exhibit the effect of reducing the amount of fuel leakage as described above.

Furthermore, according to the present embodiment, the control device 90 includes the PL injection control unit 92 that controls the fuel injection valve 1 to initiate the valve closing operation after the needle 20 has been unseated from the seating surface 11s and before reaching the maximum valve open position (full lift position). In such PL injection, the injection is likely to be performed at a low pressure. Therefore, the leaked fuel is likely to adhere to the body outer surface 114 of the body, and the deposit is likely to be developed. Therefore, according to the present embodiment, the configuration, in which the inter-injection hole distance L is set to be smaller than the inflow port gap distance H, is employed in the fuel injection system that performs the PL injection. Thus, the configuration enables to suitably exhibit the effect of reducing the amount of fuel leakage as described above.

Further, according to the present embodiment, the control device 90 includes the compression stroke injection control unit 93 that controls the fuel injection valve 1 so as to inject the fuel from the injection holes 11a in a period including a part of the compression stroke period of the internal combustion engine. In the compression stroke injection, the pressure outside the injection holes 11a, that is, the pressure of the combustion chamber 2 continues to rise even immediately after the valve has been closed. Therefore, the residual fuel is hardly discharged. Therefore, according to the present embodiment, the configuration, in which the inter-injection hole distance L is set to be smaller than the inflow port gap distance H, is employed to the fuel injection system for performing the compression stroke injection. Therefore, the configuration enables to suitably exhibit the effect to enhance the property for discharging the residual fuel discharging as described above.

Further, according to the present embodiment, the valve body tip end face 22 of the outer surface of the needle 20 is a surface including the seat position R1. The valve body tip end face 22 is curved in the direction to swell toward the body bottom surface 112. For that reason, when the needle 20 and the injection hole body 11 are resiliently deformed and come into surface contact with each other, the surface contact area of the valve body tip end face 22 can be increased, as compared to a case where tapered surfaces having different taper angles, respectively, are connected to each other at the seat position R1 to be in a non-curved shape. For that reason, according to the present embodiment, the configuration, in which the valve body tip end face 22 has the curved shape, enables to enhance a sealing property between the seat surface 20s and the seating surface 11s. Therefore, the configuration enables to reduce a possibility that the fuel leaks from the seat upstream passage Q10 to the seat downstream passage Q20 when the valve is closed.

Second Embodiment

Figure 16:
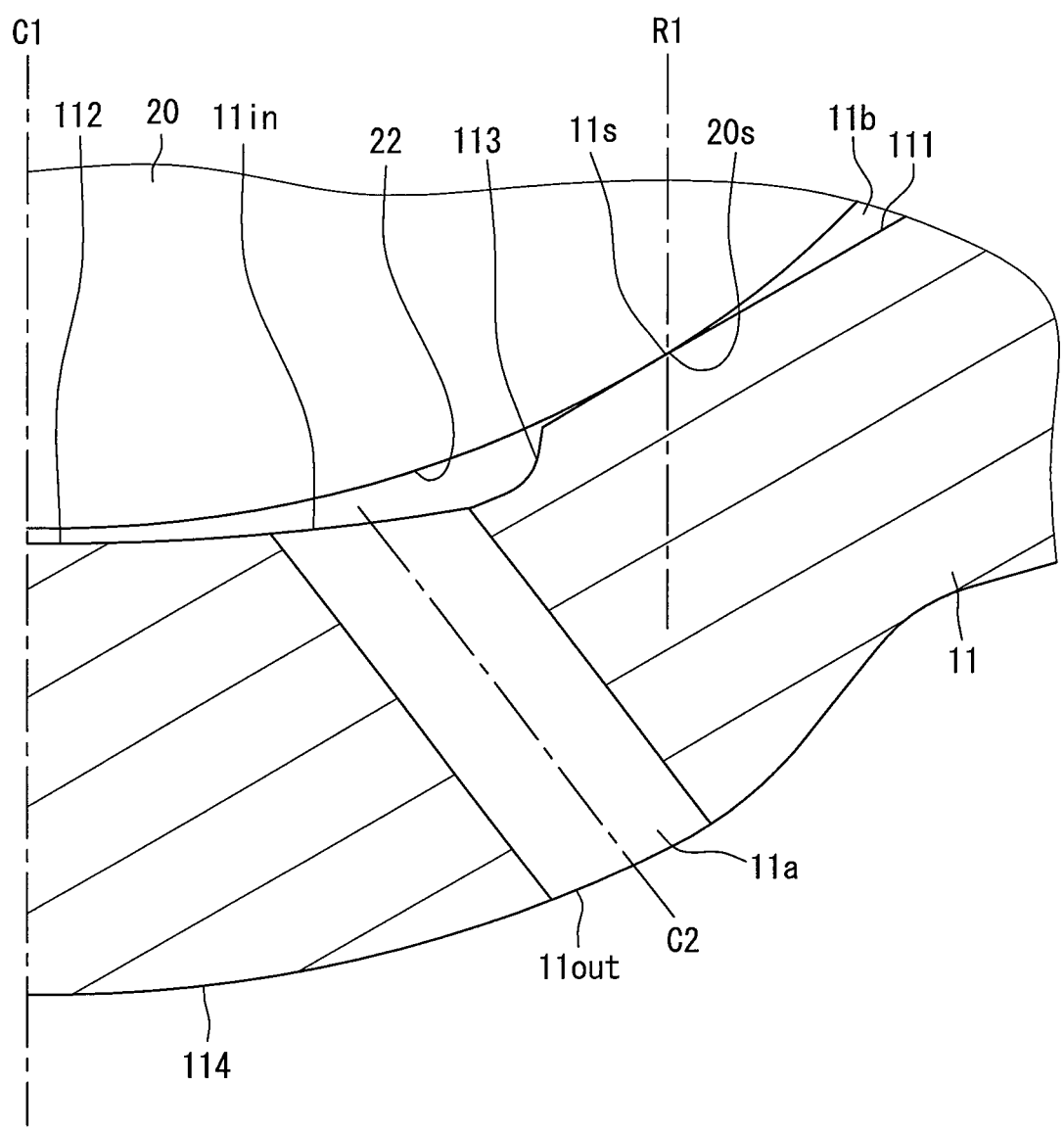
FIG. 16 is a cross-sectional view showing an injection hole body and a needle included in a fuel injection valve according to a second embodiment.

In the above-described first embodiment, the entirety of the body bottom surface 112 is in the curved shape. To the contrary, in the present embodiment, as shown in FIG. 16, at least a part of the body bottom surface 112 is in a flat shape extending perpendicularly to the axis line C1. Strictly speaking, at least a region of the body bottom surface 112 on the radially inner side of the virtual inscribed circle R4 is in a flat shape. Further, according to the present embodiment, the region of the body bottom surface 112 on the radially inner side of the inflow central virtual circle R2 is also in a flat shape.

Third Embodiment

Figure 17:
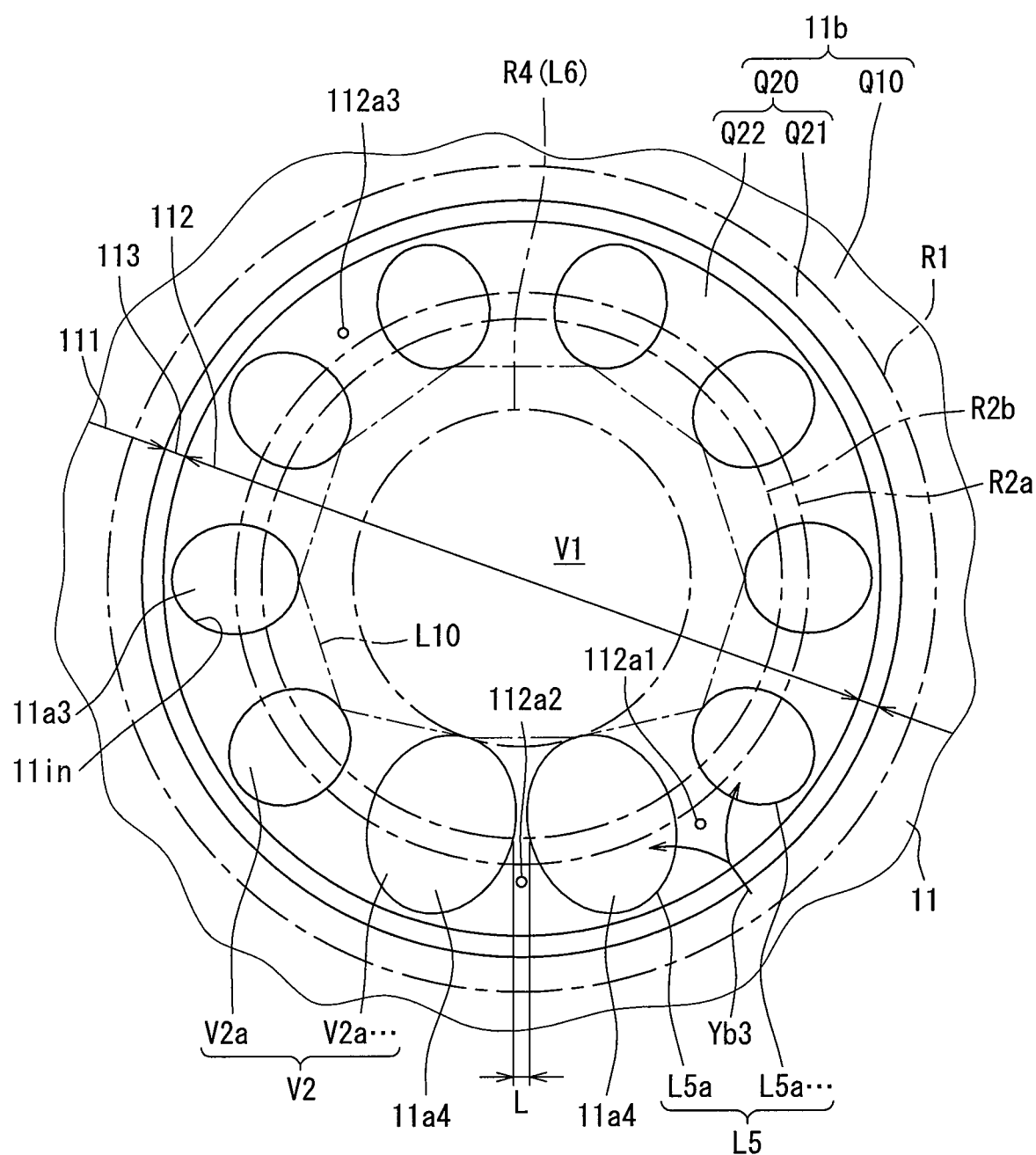
FIG. 17 is a top view showing an injection hole body of a fuel injection valve as viewed from the side of an inflow port of an injection hole, according to a third embodiment.

In the first embodiment, all of the multiple injection holes 11a are in the same shape. In this regard, in the present embodiment, as shown in FIG. 17, multiple types of injection holes 11a in different sizes are formed. Specifically, the injection holes 11a includes multiple small injection holes 11a3 each having a small area of the inflow port 11in and multiple large injection holes 11a4 each having an area of the inflow port 11in larger than the area of the inflow port 11in of the small injection hole 11a3. The multiple small injection holes 11a3 and the multiple large injection holes 11a4 are placed annularly around the axis line C1 of the injection hole body 11. The multiple large injection holes 11a4 are placed adjacent to each other.

Figure 18:
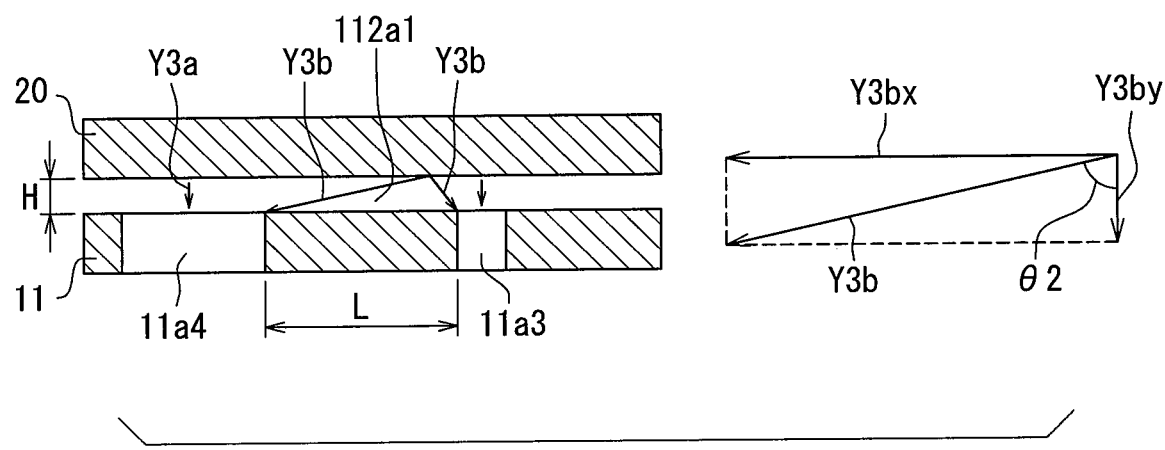
FIG. 18 is a cross-sectional view schematically showing an injection hole body and a needle included in a fuel injection valve and for illustrating an inflow angle of a lateral inflow fuel according to a third comparative example.

Operational effects of the placement will be described below with reference to FIGS. 17 to 19. In FIG. 17, in the inter-injection hole portion 112a, a first inter-injection hole portion 112a1 is an inter-injection hole portion between the small injection hole 11a3 and the large injection hole 11a4 adjacent to each other. In the inter-injection hole portion 112a, a second inter-injection hole portion 112a2 is an inter-injection hole portion between the large injection holes 11a4 adjacent to each other. A third inter-injection hole portion 112a3 is an inter-injection hole portion between adjacent small injection holes 11a3.

When the fuel flowing from the seat upstream passage Q10 into the first inter-injection hole portion 112a1 branches into the small injection hole 11a3 and the large injection hole 11a4, the fuel branches so as to flow more to the large injection hole 11a4 than to the small injection hole 11a3. For that reason, as shown in FIG. 18, an inflow angle θ2 of the lateral inflow fuel Y3b that branches from the first inter-injection hole portion 112a1 and flows into the large injection hole 11a4 increases.

On the other hand, the fuel flowing from the seat upstream passage Q10 into the second inter-injection hole portion 112a2 branches to each of the two large injection holes 11a4 so as to flow at a uniform flow rate when branching. For that reason, as shown in FIG. 19, in the lateral inflow fuel Y3b which branches from the second inter-injection hole portion 112a2 and flows into the large injection hole 11a4, the inflow angle θ2 is smaller than that of the lateral inflow fuel Y3b which branches from the first inter-injection hole portion 112a1 and flows into the large injection hole 11a4.

Figure 19:
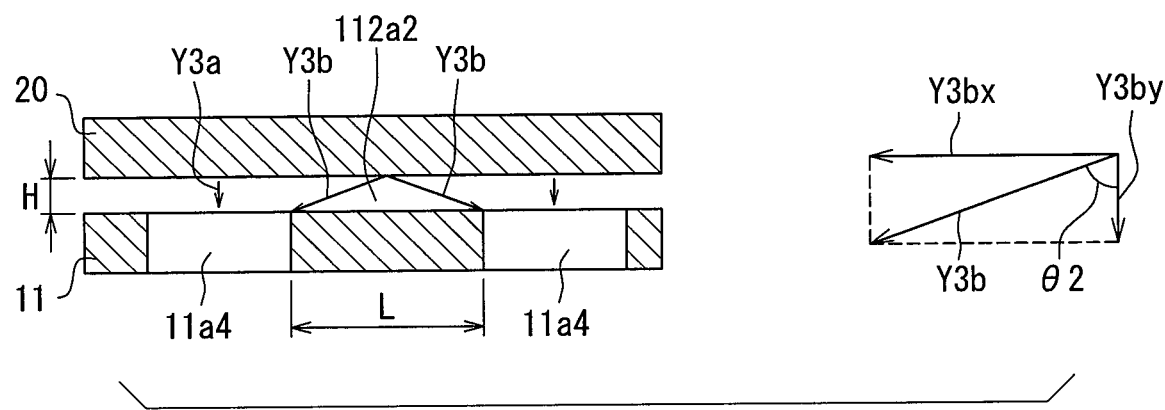
FIG. 19 is a cross-sectional view schematically showing an injection hole body and a needle included in the fuel injection valve and for illustrating an inflow angle of a lateral inflow fuel according to the third embodiment.

Therefore, in an assumable case in which the large injection holes 11a4 and the small injection holes 11a3 are alternately placed contrary to the present embodiment, the second inter-injection hole portion 112a2 capable of decreasing the inflow angle θ as shown in FIG. 19 does not exist. To the contrary, in the present embodiment, the multiple large injection holes 11a4 are placed adjacent to each other. Therefore, the second inter-injection hole portion 112a2 capable of decreasing the inflow angle θ2 exists. Therefore, a pressure loss of the fuel flowing from the sac chamber Q22 into the injection hole 11a can be reduced.

In the first embodiment, as shown in FIG. 7, the inter-injection hole distances L are the same for all the injection holes 11a. To the contrary, in the present embodiment, as shown in FIG. 17, the inter-injection hole distance L is different among the first inter-injection hole portion 112a1, the second inter-injection-hole portion 112a2, and the third inter-injection-hole portion 112a3. In this configuration where the different inter-injection-hole distances L exist as described above, the smallest inter-injection hole distance L is set to be smaller than the inflow port gap distance H at the time of full lift. In the present embodiment, the largest inter-injection hole distance L is also set to be smaller than the inflow port gap distance H at the time of full lift.

Further, for example, in the configuration shown in FIG. 17, the inter-injection hole distances L on both adjacent sides of the first inter-injection hole portion 112a1 are different from each other. Specifically, the inter-injection hole distance L of the large injection holes 11a4 on the one adjacent side is larger than the inter-injection hole distance L of the small injection holes 11a3 on the other adjacent side. In this manner, in the configuration where the inter-injection hole distances L on both adjacent sides are different from each other, the inter-injection hole distance L which is larger is set to be smaller than the inflow port gap distance H. Further, according to the present embodiment, the inter-injection hole distance L which is smaller is also set to be smaller than the inflow port gap distance H.

Fourth Embodiment

Figure 20:
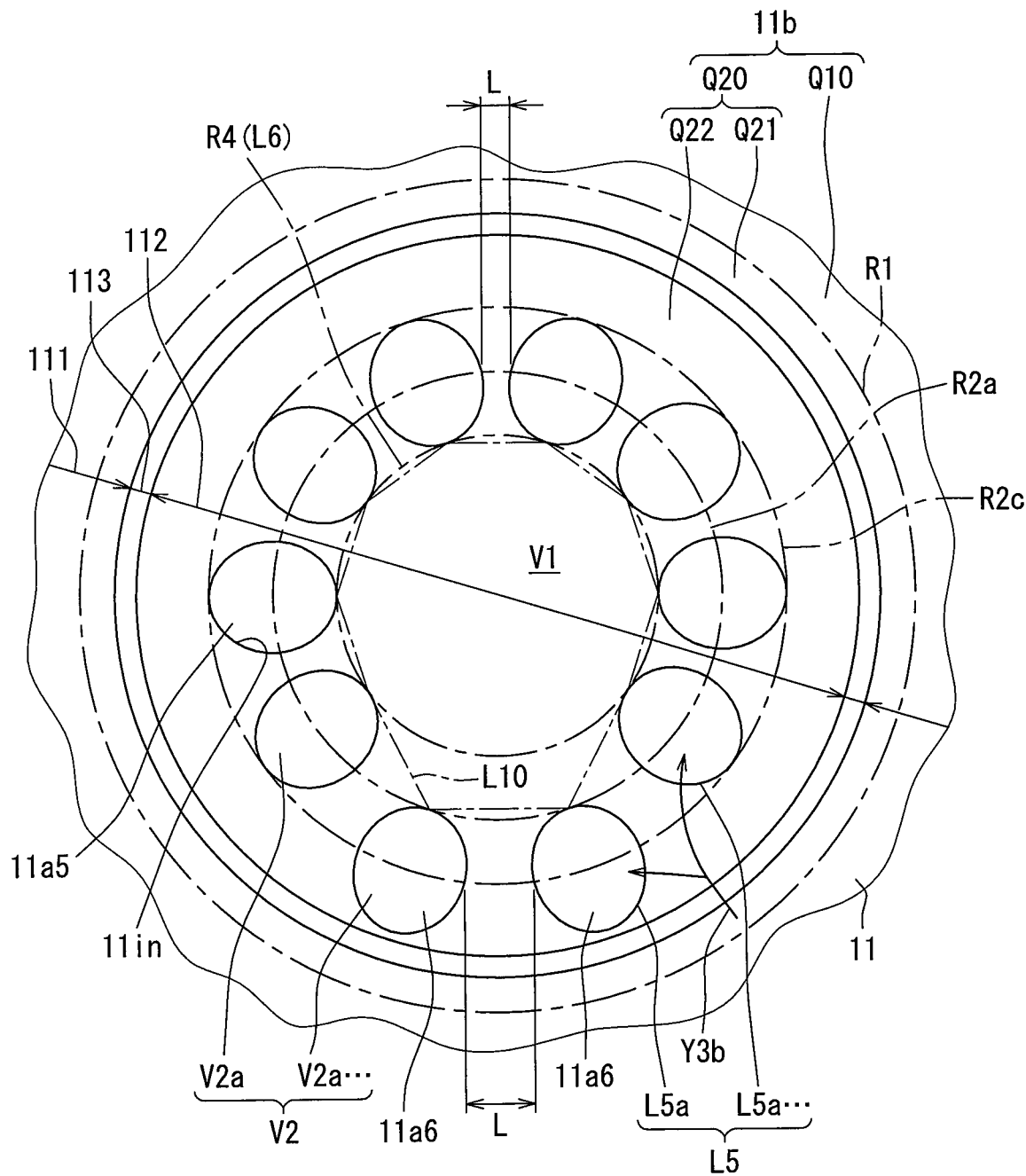
FIG. 20 is a top view showing an injection hole body of a fuel injection valve as viewed from the side of an inflow port of an injection hole according to a fourth embodiment.

In the first embodiment, all of the multiple injection holes 11a are placed on the same inflow central virtual circle R2. On the other hand, in the present embodiment, as shown in FIG. 20, injection holes 11a are placed on virtual circles having different sizes. Specifically, eight injection holes 11a are placed on a first inflow central virtual circle R2a, and two injection holes 11a are placed on a second inflow central virtual circle R2c. The first inflow central virtual circle R2a is smaller than the second inflow central virtual circle R2c. In other words, the holes 11a includes inner injection holes 11a5, which are located on the first inflow central virtual circle R2a having a diameter less than a predetermined value, and outer injection holes 11a6 located on the second inflow central virtual circle R2c having a diameter greater than the predetermined value, among the virtual circles centered on the axis line C1. The multiple inner injection holes 11a5 and the multiple outer injection holes 11a6 are placed annularly around the axis line C1 of the injection hole body 11. The multiple outer injection holes 11a6 are placed adjacent to each other.

The operational effects of the placement described above are the same as those of the third embodiment, and the inflow angle θ2 is decreased to reduce the pressure loss. In other words, in an assumable case where the inner injection holes 11a5 and the outer injection holes 11a6 are alternately placed contrary to the present embodiment, the inter-injection hole portion 112a that can decrease the inflow angle 82 does not exist. On the other hand, in the present embodiment, the multiple outer injection holes 11a6 are placed adjacent to each other. Therefore, there is the inter-injection hole portion 112a that can decrease the inflow angle θ2. Therefore, a pressure loss of the fuel flowing from the sac chamber Q22 into the injection hole 11a can be reduced.

In the present embodiment, similarly to the third embodiment, the inter-injection hole distances L, which are different from each other, exist. In the configuration, the smallest inter-injection hole distance L is set to be smaller than the inflow port gap distance H at the time of the full lift. Further, according to the present embodiment, the largest inter-injection hole distance L is also set to be smaller than the inflow port gap distance H at the time of the full lift. In a case where the inflow port gap distances H on both adjacent sides of the injection hole 11a are different from each other, the inflow port gap distance H which is larger is set to be larger than the inter-injection hole distance L. Further, according to the present embodiment, the inflow port gap distance H which is smaller is also set to be larger than the inter-injection hole distance L.

Fifth Embodiment

Figure 21:
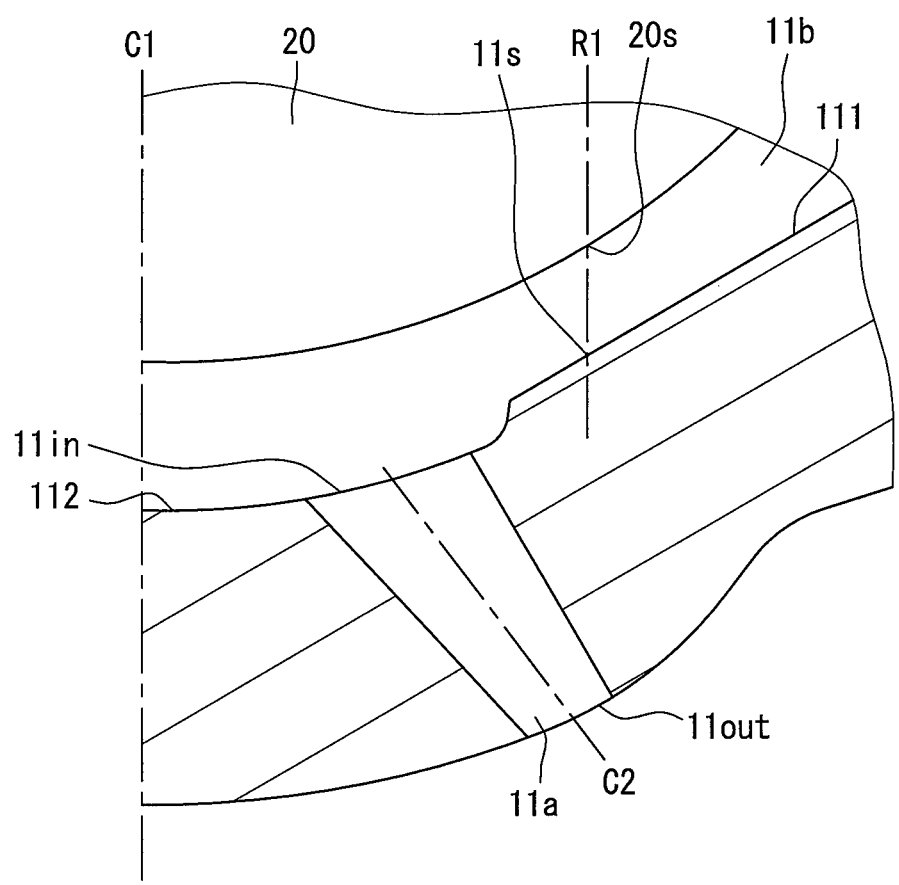
FIG. 21 is a cross-sectional view showing an injection hole body and a needle and for illustrating an injection hole shape according to a fifth embodiment.

The injection holes 11a according to the first embodiment are each in a straight shape in which the passage cross-sectional area is uniform from the inflow port 11*in* to the outflow port 11 out. The passage cross-sectional area is an area in a direction perpendicular to an axis line C2 of the injection hole 11*a*. The axis line C2 is the line connecting the center of the inflow port 11*in* and the center of the outflow port 11 out. To the contrary, in the present embodiment, as shown in FIG. 21, the injection hole 11*a* is in a tapered shape in which the diameter gradually decreases from the inflow port 11*in* to the outflow port 11 out in the cross section including the axis line C2. In addition, an opening area of the inflow port 11*in* is larger than an opening area of the outflow port 11 out.

As described above, in the present embodiment, the opening area of the inflow port 11*in* is larger than the opening area of the outflow port 11*out*. Therefore, the configuration enables to promote the inflow of the fuel from the sac chamber Q22 into the inflow port 11*in* immediately after the valve has been closed as compared with the case of the straight shape. Therefore, the discharging property of the residual fuel described above can be enhanced. In addition, the opening area of the inflow port 11*in* is larger than the opening area of the outflow port 11*out*, and therefore, the penetration force described above can be increased.

Sixth Embodiment

Figure 22:
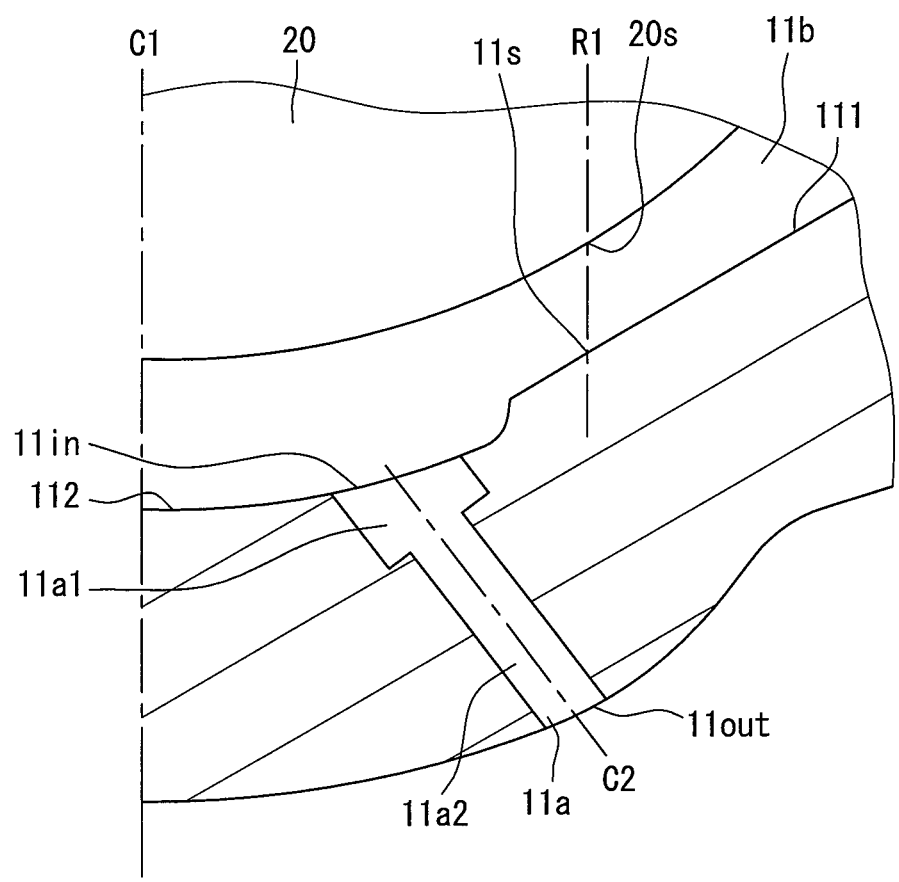
FIG. 22 is a cross-sectional view showing an injection hole body and a needle and for illustrating an injection hole shape according to a sixth embodiment.

In the present embodiment, as shown in FIG. 22, the injection hole 11*a* is in a stepped shape in the cross-section including the axis line C2. The injection hole 11*a* has an injection hole upstream portion 11*a*1 which has a large passage cross sectional area and an injection hole downstream portion 11*a*2 which has a small passage cross-sectional area. The passage cross-sectional area is the area in the direction perpendicular to the axis line C2 of the injection hole 11*a*. The axis line C2 is a line connecting the center of the inflow port 11*in* with the center of the outflow port 11*out*. The injection hole upstream portion 11*a*1 and the injection hole downstream portion 11*a*2 are each in a straight shape extending at the constant diameter along the direction of the axis line C. The diameter of the injection hole upstream portion 11*a*1 is larger than the diameter of the injection hole downstream portion 11*a*2. Therefore, the opening area of the inflow port 11*in* is larger than the opening area of the outflow port 11 out.

As described above, also according to the present embodiment, the opening area of the inflow port 11*in* is larger than the opening area of the outflow port 11 out in the same manner as in the fifth embodiment. Therefore, the configuration enables to enhance the property for discharging the residual fuel to increase the penetration force.

Seventh Embodiment

The fuel injection valve 1 according to the first embodiment includes the movable core 30 having the core facing surface 31*c* which is singular (refer to FIG. 3). Due to the above configuration, a magnetic flux (incoming magnetic flux) entering the movable core 30 and a magnetic flux (outgoing magnetic flux) exiting the movable core 30 are oriented in different directions (refer to a dotted arrow in FIG. 3). In other words, one of the incoming magnetic flux and the outgoing magnetic flux is a magnetic flux that enters and exits in the direction of the axis line C1 to apply the valve opening force to the movable core 30, while the other of the incoming magnetic flux and the outgoing magnetic flux is a magnetic flux that enters and exits in the radial direction of the movable core 30 and does not contribute to the valve opening force.

Figure 23:
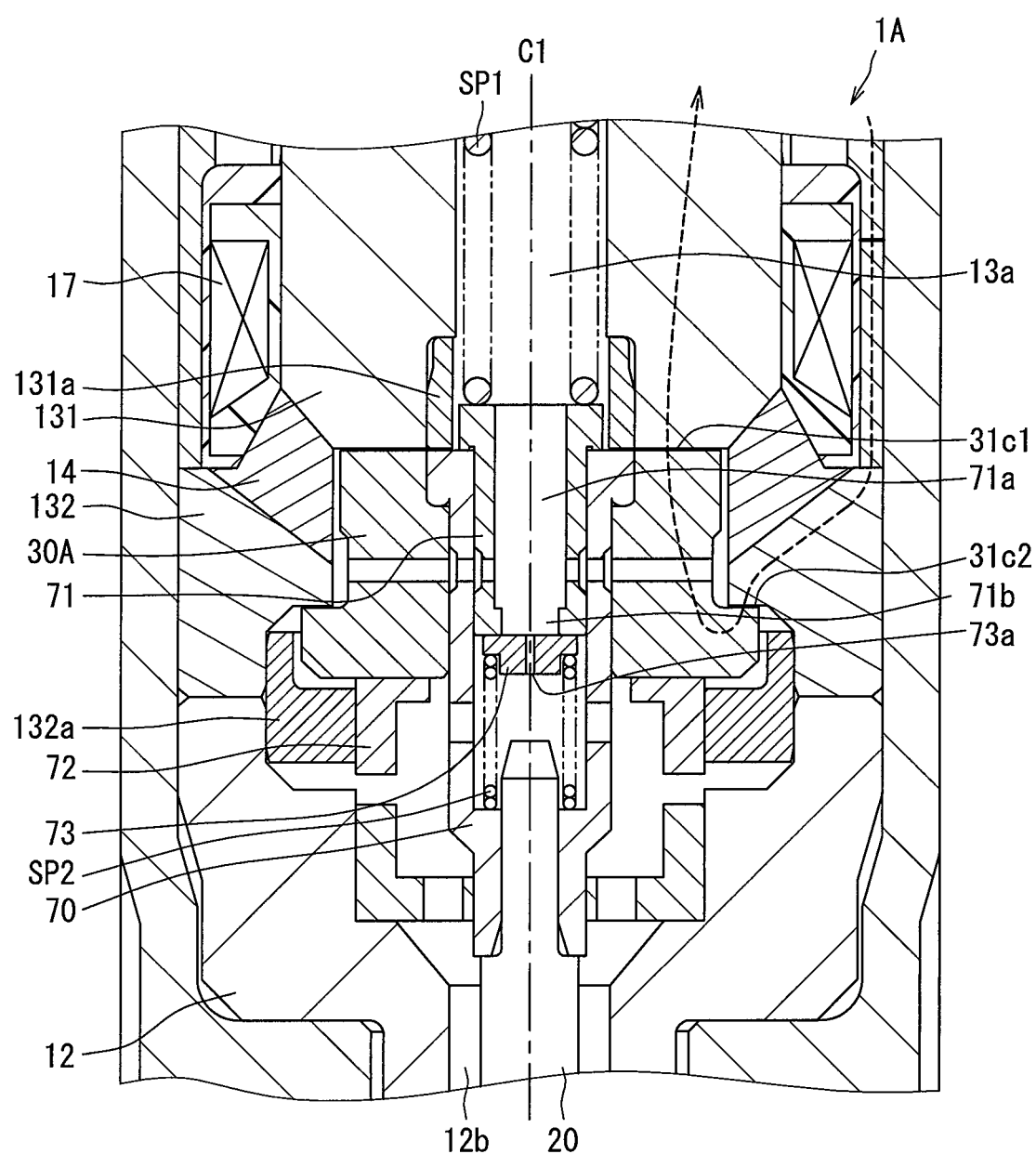
FIG. 23 is a cross-sectional view showing a fuel injection valve according to a seventh embodiment.

On the other hand, a fuel injection valve 1A according to the present embodiment shown in FIG. 23 includes a movable core 30A having two core facing surfaces, that is, a first core facing surface 31*c*1 and a second core facing surface 31*c*2. The fuel injection valve 1A further includes a first stationary core 131 having an attraction surface facing the first core facing surface 31*c*1 and a second stationary core 132 having an attraction surface facing the second core facing surface 31*c*2.

The nonmagnetic member 14 is provided between the first stationary core 131 and the second stationary core 132. With the above configuration, each of the incoming magnetic flux and the outgoing magnetic flux enter and exit in the direction along the axis line C1 to become a magnetic flux that causes a valve opening force to act on the movable core 30A (refer to a dotted arrow in FIG. 23). The movable core 30A and the needle 20 are connected with each other via a coupling member 70. An orifice member 71 is equipped to the coupling member 70.

When the coil 17 is energized to open the needle 20, the movable core 30A is attracted toward the stationary cores 131 and 132 via both the first core facing surface 31*c*1 and the second core facing surface 31*c*2. As a result, the needle 20 performs the valve opening operation together with the movable core 30A, the coupling member 70, and the orifice member 71. When the needle 20 is at the full lift position, the coupling member 70 is in contact with a stopper 131*a* fixed to the first stationary core 131, and the first core facing surface 31*c*1 and the second core facing surface 31*c*2 do not make contact with the stationary cores 131 and 132, respectively.

When the energization of the coil 17 is stopped in order to close the needle 20, the resilient force of the second spring member SP2 applied to the movable core 30 is applied to the orifice member 71. As a result, the needle 20 performs the valve closing operation together with the movable core 30A, the coupling member 70, and the orifice member 71.

A slide member 72 is equipped to the movable core 30A and operates to open and close together with the movable core 30A. The slide member 72 slides in the direction along the axis line C1 with respect to a cover 132*a* fixed to the second stationary core 132. In short, the needle 20, which operates to open and close together with the movable core 30A, the slide member 72, the coupling member 70, and the orifice member 71, is supported by the slide member 72 in the radial direction.

The fuel flowing into the flow channel 13*a* formed inside the stationary core 13 flows in order through an internal passage 71*a* of the orifice member 71, an orifice 71*b* formed in the orifice member 71, and an orifice 73*a* formed in a moving member 73. Thus, the fuel flows into the flow channel 12*b*. The moving member 73 is a member that moves along the direction of the axis line C1 so as to open and close the orifice 71*b*. When the moving member 73 opens and closes the orifice 71*b*, the degree of throttle of the flow channel between the flow channel 13*a* and the flow channel 12*b* is changed.

Also in the fuel injection valve 1A according to the present embodiment, the shape of the fuel passage 11*b* formed between an outer peripheral surface of the needle 20 and an inner peripheral surface of the injection hole body 11 is the same as that of the fuel injection valve 1 according to the first embodiment, and the inter-injection hole distance L is smaller than the inflow port gap distance H. Therefore, the fuel injection valve 1A including the movable core 30A having the two attraction surfaces also enables to achieve both reduction in the fuel leakage amount by reducing the volume of the seat downstream passage Q20 and reduction in the pressure loss by reducing the inter-injection hole distance L.

Eighth Embodiment

Figure 24:
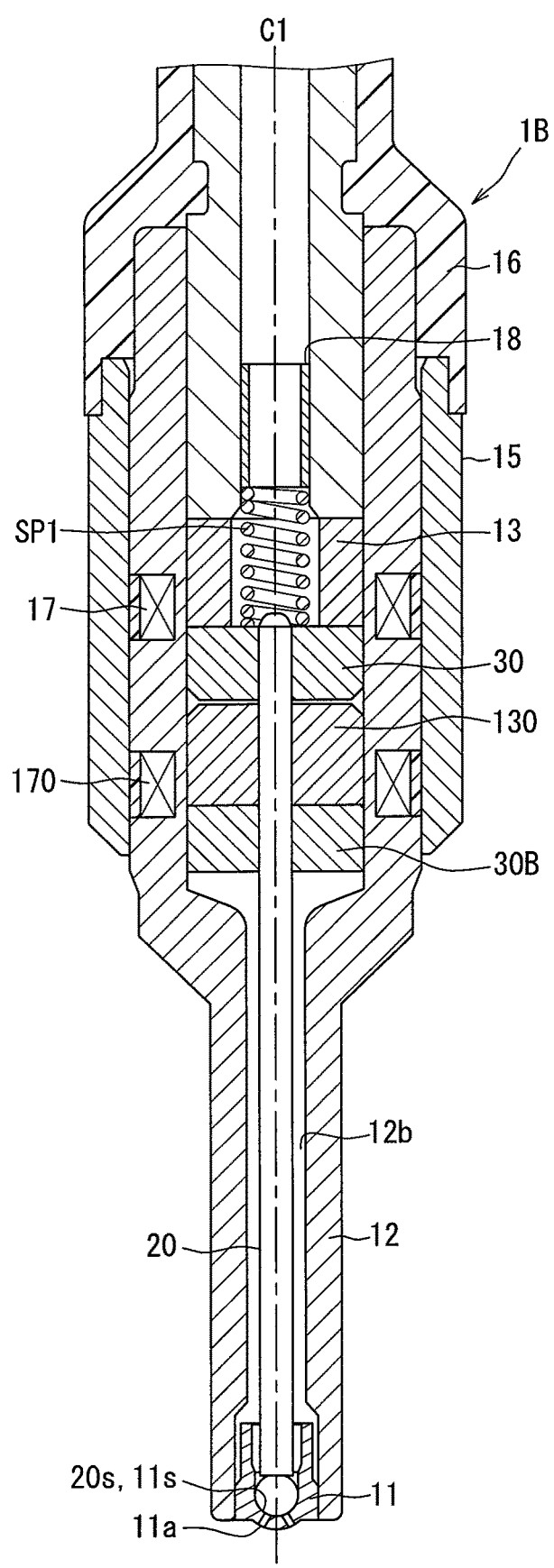
FIG. 24 is a cross-sectional view showing a fuel injection valve according to an eighth embodiment.

The fuel injection valve 1 according to the first embodiment includes the singular actuator having the coil 17, the stationary core 13, and the movable core 30. In addition, the actuator applies the valve closing force to the needle 20. On the other hand, a fuel injection valve 1B of the present embodiment shown in FIG. 24 includes two actuators for applying a valve closing force to the needle 20.

Specifically, the fuel injection valve 1B includes a second coil 170, a stationary core 130, and a movable core 30B in addition to the inclusion of the coil 17, the stationary core 13, and the movable core 30 which are similar to those of the first embodiment.

Specifically, the stationary cores 13 and 130 and the coils 17 and 170 are fixed in the main body 12 at different positions in the direction of the axis line C1. Further, the two movable cores 30 and 30B are placed side by side in the direction of the axis line C1 at positions to face the attraction surfaces of the respective stationary cores 13 and 130. The movable cores 30 and 30B are fixed to the needle 20 and are slidably provided in the main body 12 along the direction of the axis line C1.

When the needle 20 is caused to perform the valve opening operation, the two coils 17 and 170 are energized to attract the two movable cores 30 and 30B toward the stationary cores 13 and 130, respectively. As a result, the needle 20 fixed to the movable cores 30 and 30B opens against the resilient force of the first spring member SP1. When the needle 20 is caused to perform the valve closing operation, the energization of the two coils 17 and 170 is stopped, and the needle 20 is caused to perform the valve closing operation by application of the resilient force of the first spring member SP1 to the movable core 30.

Also in the fuel injection valve 1B according to the present embodiment, the shape of the fuel passage 11b provided between the outer peripheral surface of the needle 20 and the inner peripheral surface of the injection hole body 11 is the same as that of the fuel injection valve 1 according to the first embodiment. In addition, the inter-injection hole distance L is smaller than the inflow port gap distance H. Therefore, the fuel injection valve 1B including the two actuators also enables to achieve both of the reduction in the fuel leakage amount by reducing the volume of the seat downstream passage Q20 and the reduction in the pressure loss by reducing the inter-injection hole distance L.

Other Embodiments

Although the multiple embodiments of the present disclosure have been described above, not only the combinations of the configurations explicitly shown in the description of each embodiment, but also the configurations of multiple embodiments may be partially combined even if those are not explicitly shown unless a problem arises in the combination in particular. Unspecified combinations of the configurations described in the multiple embodiments and the modification examples are considered to be also disclosed in the following description.

In the first embodiment, the seat angle θ is set to an angle smaller than 90 degrees, however may be set to 90 degrees. In this case, the seat angle θ may be an angle deviated from 90 degrees to a large value or a small value as long as the seat angle θ falls within an allowable range of processing accuracy or assembly accuracy. In the example shown in FIGS. 7 and 8, all of the injection holes 11a have the common inflow central virtual circle R2. On the other hand, as shown in FIG. 17, in the configuration where the different inflow central virtual circles R2a and R2b arise together, the inter-injection hole distance L is defined as follows. For example, in the case of the inter-hole injection distance L between the two large injection holes 11a4 and in the case of the inter-injection hole distance L between the two small injection holes 11a3, the inter-injection hole distance L has the common inflow central virtual circles R2a and R2b. Therefore, the shortest arc distance along those virtual circles is defined as the inter-injection hole distance L. On the other hand, the inter-injection hole distance L between the large injection hole 11a4 and the small injection hole 11a3 does not have a common virtual circle. Therefore, the shortest straight line distance between the large injection hole 11a4 and the small injection hole 11a3 is defined as the inter-injection hole distance L. The inflow central virtual circles R2, R2a, and R2b are concentric with the circle related to the seat position R1. Therefore, the shortest arc distance is a distance of a circular arc extending in parallel along the seat surface 20s. In the first embodiment, the inflow port gap distance H is defined as the gap distance at the inflow port center point A. On the other hand, the inflow port gap distance H may be defined as a gap distance at a position in the peripheral edge of the inflow port 11in farthest from the axis line C1, or may be defined as a gap distance at a position in the peripheral edge of the inflow port 11in closest to the axis line C1. Further, the inflow port gap distance H may be defined as a gap distance at a position in the peripheral edge of the inflow port 11in intersecting with the inflow central virtual circle R2.

In the first embodiment, in the configuration where the inter-injection hole distance L and the inflow port gap distance H of each of the multiple injection holes 11a are the same, the inter-injection hole distance L is set to be smaller than the inflow port gap distance H. On the other hand, when different inter-injection hole distances and different inflow port gap distances arise, at least one inter-injection hole distance may be set to be smaller than at least one inflow port gap distance. Alternatively, the inter-injection hole distance between the two adjacent injection holes 11a may be set to be smaller than the inflow port gap distance of either one of those two injection holes 11a.

In the first embodiment, the inflow port gap distance H, which is the size of the gap between the outer surface of the needle 20 and the inflow port 11in, is the separation distance from the needle 20 at the center point A of the inflow port 11in. On the other hand, the inflow port separation distance may be the separation distance between the needle 20 and a portion of the injection hole 11a other than the center point A. For example, the inflow port gap distance H may be a separation distance in the direction of the axis line C1 at a position in the injection hole 11a farthest from the needle 20 or may be a separation distance in the direction of the axis line C1 at a position in the injection hole 11a nearest to the needle 20.

In each of the above embodiments, the fuel injection valves 1, 1A, and 1B are used to inject a gasoline fuel from the injection holes 11a, however a fuel injection valve to inject an ethanol fuel or a methanol fuel from the injection holes 11a may be used. An ethanol fuel and a methanol fuel have higher viscosity than that of a gasoline fuel. Therefore, the pressure loss of the ethanol fuel and the methanol fuel flowing through the fuel passage 11b and the injection hole 11a is large. In particular, a pressure loss occurring when the fuel is bent and flows from the sac chamber Q22 into the inflow ports 11in is large. For that reason, in an assumable case where the inflow port gap distance H is reduced to reduce the volume of the seat downstream passage Q20, the change in the flow velocity immediately after flowing in from the inflow port 11in becomes large. Therefore, there is a concern that cavitation occurs in the injection holes 11a. In view of the above concern, according to the present embodiment, the inter-injection hole distance L is set to be smaller than the inflow port gap distance H, as described above. Therefore, the increase in pressure loss can be mitigated by reducing the inter-injection hole distance L. Therefore, as compared with the case where the inter-injection hole distance L is set to be larger than the inflow port gap distance H, the concern of the occurrence of cavitation can be reduced.

According to the first embodiment, the fuel injection valve 1 is of a center placement type. The fuel injection valve 1 is attached to a portion of the cylinder head located at the center of the combustion chamber 2. Fuel is injected from above the combustion chamber 2 in the direction of the center line of the piston. On the other hand, the fuel injection valve 1 may be of a side placement type fuel injection valve which is attached to a portion of the cylinder block located on a lateral side of the combustion chamber 2 and injects the fuel from the lateral side of the combustion chamber 2.

According to the first embodiment, ten injection holes 11a are formed, however, the number of the injection holes is not limited to 10. The number of the injection holes may be other number as long as being 2 or more and may be, for example, 8. According to the first embodiment, the movable portion M is supported in the radial direction at two positions including a portion (needle tip portion) of the needle 20, which faces the inner wall surface 11c of the injection hole body 11, and the outer peripheral surface 51d of the cup 50. In the seventh embodiment, the movable portion is supported in the radial direction at two positions including the needle tip portion and the slide member 72. On the other hand, the movable portion M may be supported in the radial direction at two positions including the outer peripheral surface of the movable core 30 and the needle tip portion.

According to the first embodiment, the inner core 32 is made of a nonmagnetic material, but may be formed of a magnetic material. In an assumable case where the inner core 32 is made of the magnetic material, the inner core 32 may be made of a weak magnetic material having a weaker magnetic property than that of the outer core 31. Similarly, the needle 20 and the guide member 60 may be made of a weak magnetic material that is weaker than that of the outer core 31.

According to the first embodiment, when the movable core 30 is moved by the predetermined amount, the cup 50 is interposed between the first spring member SP1 and the movable core 30 in order to materialize a core boost structure in which the movable core 30 makes contact with the needle 20 to start the valve opening operation. On the other hand, the cup 50 may be eliminated. In this configuration, a third spring member different from the first spring member SP1 may be provided, and a core boost structure may be employed in which the movable core 30 is urged toward the injection hole side by the third spring member.

Figure 25:
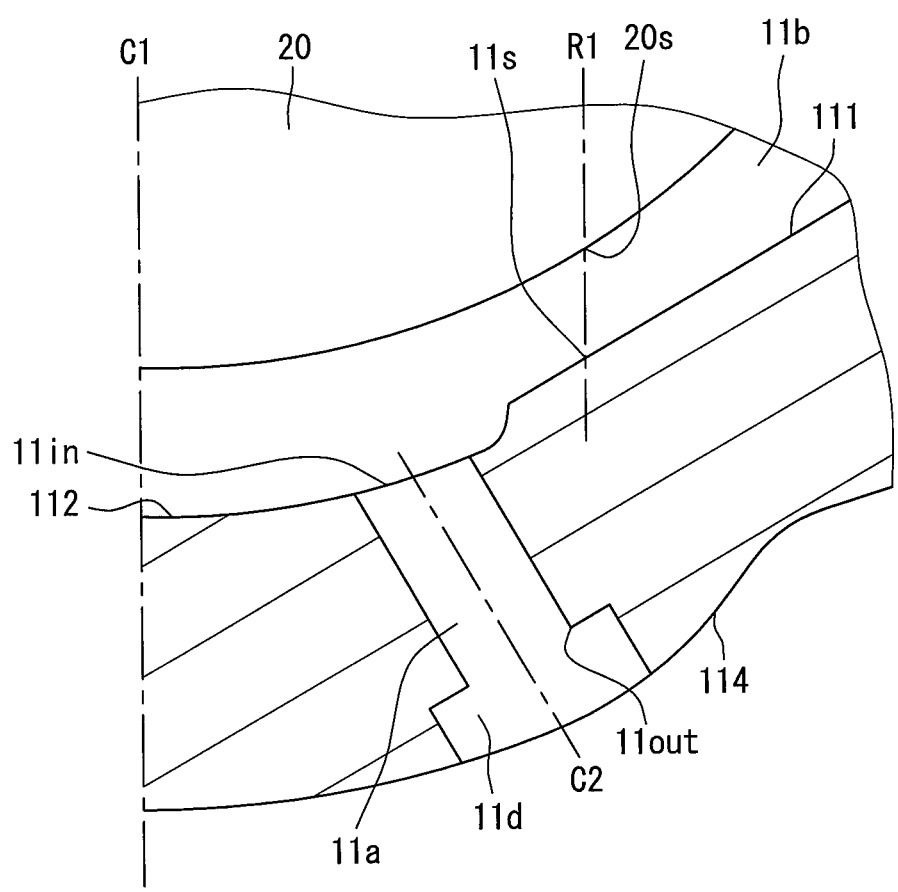
FIG. 25 is a cross-sectional view showing a fuel injection valve according to another embodiment.

As shown in FIG. 25, a recess portion 11d may be formed in the body outer surface 114. The recess portion 11d is circular when viewed along the direction of the axis line C2. The diameter of the recess portion 11d is larger than the diameter of the outflow port 11out so as to include the outflow port 11out inside. A circular center of the recess portion 11d coincides with the axis line C2 of the injection hole 11a. With the formation of the recess portion 11d in this manner, the length of the injection hole 11a is shortened, and the penetration force of the fuel injected from the outflow port 11out is reduced. In addition, the thickness dimension can be restricted from becoming shorter in the portion of the injection hole body 11 other than the injection holes 11a. Therefore, a significant decrease in the strength of the injection hole body 11 can be avoided.

In the case of the structure shown in FIG. 25, as in the embodiments described above, the volume V2a of the injection hole 11a is the volume from the inflow port 11in to the outflow port 11out, and the volume of the recess portion 11d is not included in the volume V2a of the injection hole 11a. The fuel residing in the recess portion 11d is in a pressure-released state, and therefore, the portion in which the fuel residing in the pressure released state is not regarded as a part of the injection hole 11a. It is noted that, the total injection hole volume V2 is larger than the center volume V1 in the seated state.

In the structure formed with the recess portion d shown in FIG. 25, the shape of the injection hole 11a may be a straight shape shown in FIGS. 25 and 8, a tapered shape shown in FIG. 21, or an inversely tapered shape in which the taper direction is reversed from that in FIG. 21.

Figure 26:
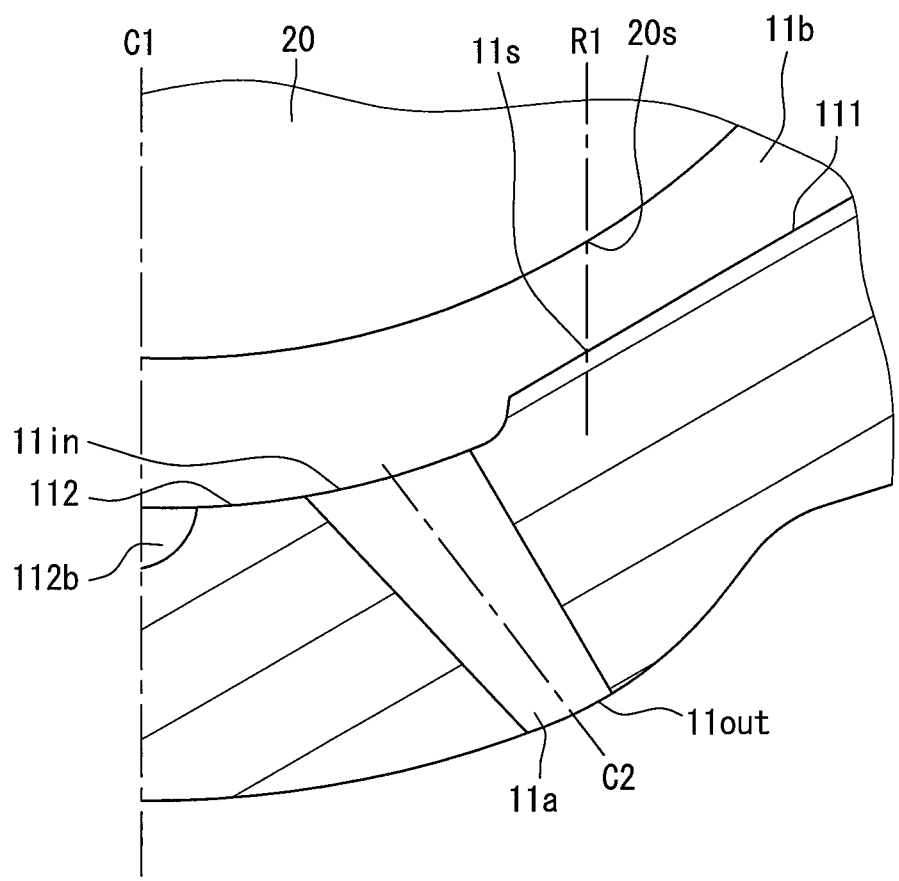
FIG. 26 is a cross-sectional view showing a fuel injection valve according to still another embodiment.

As shown in FIG. 26, a recess portion 112b may be provided in the body bottom surface 112. The recess portion 112b is formed at a position concentric with the axis line C1. A region within the recess portion 112b forms a part of the sac chamber Q22. In other words, the region in the recess portion 112b is included in the sac chamber Q22, included in the seat downstream passage Q20, and included in the fuel passage 11b. The center volume V1, which is an object to be compared in size with the total injection hole volume V2, also includes the volume in the recess portion 112b, and the total injection hole volume V2 is larger than the center volume V1 in the seated state.

Figure 27:
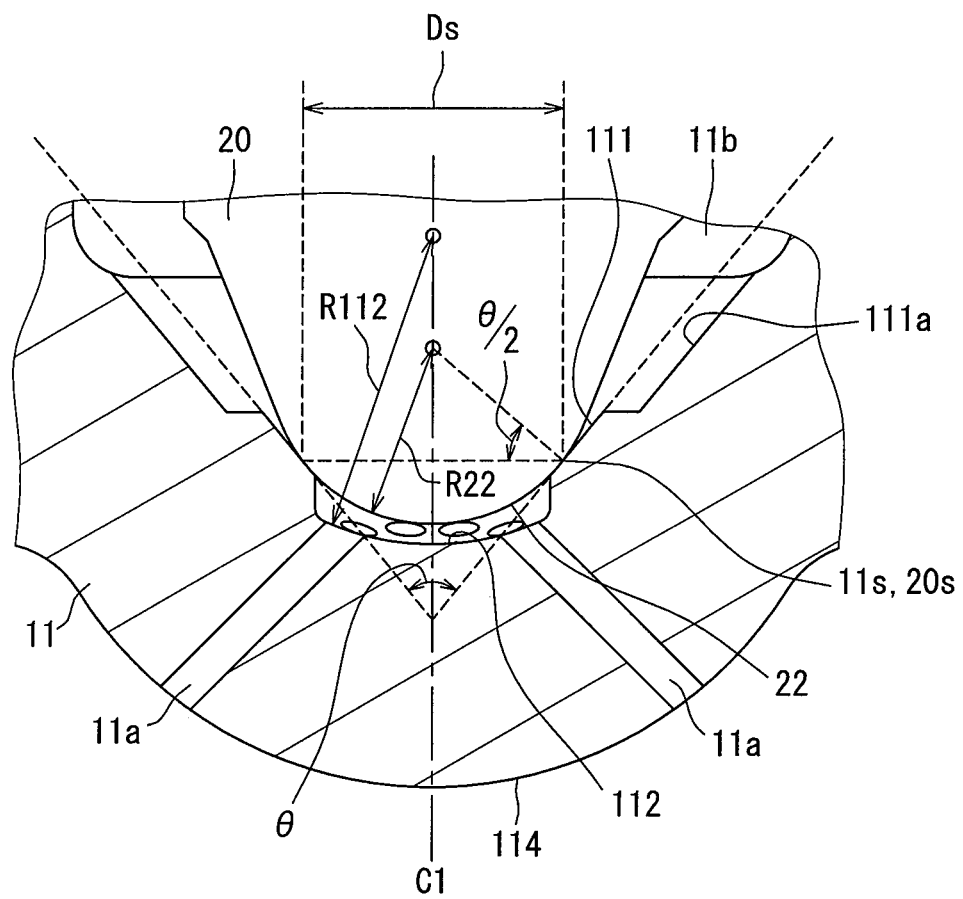
FIG. 27 is a cross-sectional view showing a fuel injection valve according to yet another embodiment.

As shown in FIG. 27, an enlarged diameter tapered surface 111a may be formed on the upstream side of the tapered surface 111. The enlarged diameter tapered surface 111a is non-parallel to the axis line C1 in the longitudinal cross-sectional view. The enlarged diameter tapered surface 111a is in a tapered shape inclined with respect to the axis line C1 and is in a shape in which the diameter of the tapered surface 111 is enlarged. In the example shown in FIG. 27, the enlarged diameter tapered surface 111a is a surface parallel to the tapered surface 111. It is noted that, the enlarged diameter tapered surface 111a may be non-parallel to the tapered surface 111. In any case, the seat angle θ is defined as the apex angle of the tapered surface 111, not the apex angle of the enlarged diameter tapered surface 111a.

As described above, a region surrounded by the straight line L10 connecting the portions closest to the axis line C1 of the respective peripheral edges of the inflow ports 11in is referred to as a virtual region. As shown in FIG. 7, the virtual region may be point-symmetric and regular polygonal with the axis line C1 as the center of symmetry. Alternatively, the virtual region may be in an astigmatic shape as shown in FIGS. 17 and 25.

In each of the embodiments described above, the injection holes 11a are formed in the body bottom surface 112 among the tapered surface 111, the body bottom surface 112, and the coupling surface 113, which form the fuel passage 11*b*. On the other hand, the injection holes 11*a* may be formed in the portion of the tapered surface 111 on the downstream side of the seating surface 11*s* or may be formed in the coupling surface 113 of the tapered surface 111.

In each of the above embodiments, the needle 20 is configured to be movable relative to the movable core 30. It is noted that the movable core 30 and the needle 20 may be integrally configured so as not to be movable relative to each other.

When the second and subsequent injections related to the divided injection are performed, it is necessary for the movable core 30 to return to its initial position. However, in a case where the movable core 30 and the needle 20 are integrally formed as described above, the needle 20 becomes heavy, and the valve closing bounce tends to occur. For that reason, the effect of reducing the bounce by setting the seat angle θ to 90 degrees or less is suitably exhibited in the case of the above-mentioned integrated configuration.

The fuel injection valve described above includes the injection hole body 11 in which the multiple injection holes 11*a*, 11*a*3, and 11*a*4 are formed to inject fuel used for causing combustion in the internal combustion engine, and the valve body 20 which forms the fuel passage 11*b* communicating with the inflow port 11*in* of the injection hole with the inner surface of the injection hole body and opens and closes the fuel passage by being unseated from and seated on the seating surface 11*s* of the injection hole body. The size of the gap between the valve body and the inflow port in the center axis line direction of the valve body is the inflow port gap distance H. The interval between the adjacent inflow ports among the multiple inflow ports placed around the center axis line is the inter-injection hole distance L. The inter-injection hole distance is smaller than the inflow port gap distance in a state in which the valve body is separated from the seating surface to a position farthest away in the movable range of the valve body.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A fuel injection valve comprising:
   an injection hole body having a plurality of injection holes to inject fuel for causing combustion in an internal combustion engine; and
   a valve body configured to form a fuel passage between the valve body and an inner surface of the injection hole body to communicate with inflow ports of the injection holes, the valve body configured to open and close the fuel passage by being seated on and unseated from a seating surface of the injection hole body, wherein
   an inflow port gap distance is a size of a gap between the valve body and the inflow ports in a direction of a center axis of the valve body,
   an inter-injection hole distance is a distance between inflow ports, which are adjacent to each other in the circumferential direction, among the inflow ports placed in the circumferential direction around the center axis,
   the inter-injection hole distance is smaller than the inflow port gap distance in a state where the valve body is unseated from the seating surface and is at a farthest position in a movable range of the valve body,
   the inflow port gap distance is smaller than a diameter of a seat surface of the valve body,
   the seat surface seals fuel from being injected from the fuel injection valve in a state where the valve body is seated on the seating surface,
   all of the inter-injection hole distances are equal to each other for three or more of the injection holes placed concentrically around the center axis, and
   the inter-injection hole distance is smaller than the diameter of the inflow port.

2. The fuel injection valve according to claim 1, wherein the inter-injection hole distance is smaller than the inflow port gap distance in a state where the valve body is seated on the seating surface.

3. The fuel injection valve according to claim 1, wherein an opening area of the inflow port is larger than an opening area of an outflow port of the injection hole.

4. The fuel injection valve according to claim 3, wherein the injection hole is, in a cross section including an axis line of the injection hole, in a tapered shape in which its diameter gradually decreases from the inflow port to the outflow port.

5. The fuel injection valve according to claim 3, wherein each of the injection holes has
   an injection hole upstream portion extending at a constant diameter along the axis line of the injection hole, and
   an injection hole downstream portion communicating with a downstream of the injection hole upstream portion and extending at a constant diameter in the axis line, wherein
   a diameter of the injection hole upstream portion is larger than a diameter of the injection hole downstream portion.

6. The fuel injection valve according to claim 1, further comprising:
   a movable core configured to be attracted and moved by application of a magnetic force, wherein
   the valve body is configured to move together with the movable core to be unseated from the seating surface.

7. The fuel injection valve according to claim 1, wherein the injection holes include a plurality of small injection holes and a plurality of large injection holes,
   each of the small injection holes has its inflow port having an area of less than a predetermined area,
   each of the large injection holes has its inflow port having an area of equal to or more than the predetermined area,
   the small injection holes and the large injection holes are placed in an annular form about the center axis, and
   the large injection holes are placed adjacent to each other.

8. The fuel injection valve according to claim 1, further comprising:
   a filter configured to capture foreign matter contained in fuel flowing into the fuel passage, wherein a diameter of a portion of each of the injection holes, in which its passage cross-sectional area is minimum, is larger than a mesh interval of the filter.

9. The fuel injection valve according to claim 1, wherein a surface roughness of a portion of the injection hole body, which forms the fuel passage, is rougher than a surface roughness of a portion, which forms inner wall surfaces of the injection holes, respectively.

10. The fuel injection valve according to claim 1, wherein the fuel injection valve is a direct injection type fuel injection valve for directly injecting fuel into a combustion chamber of the internal combustion engine and is of a center placement type fuel injection valve placed at a center of the combustion chamber, wherein
outflow ports of the plurality of injection holes are placed at equal intervals about the center axis, and the plurality of inflow ports are placed at equal intervals about the center axis.

11. The fuel injection valve according to claim 1, wherein the inter-injection hole distance is a shortest arc distance extending along a virtual circle centered on the center axis.

12. The fuel injection valve according to claim 1, wherein the inflow port gap distance is a size of a gap between a portion of the inflow port, which is farthest from the center axis, and the valve body.

13. A fuel injection system comprising:
the fuel injection valve according to claim 1; and
a control device configured to control a state, in which the valve body is seated on and unseated from the seating surface, to control a state of fuel injection from the injection holes.

14. The fuel injection system according to claim 13, wherein
the control device includes a multi-stage injection control unit configured to control the fuel injection valve to inject fuel from the injection holes for a plurality of times in one combustion cycle of the internal combustion engine.

15. The fuel injection system according to claim 13, wherein
the control device includes a partial lift injection control unit configured to control the fuel injection valve to start a valve closing operation after the valve body is unseated from the seating surface and before the valve body reaches its maximum valve open position.

16. The fuel injection system according to claim 13, wherein
the control device includes a compression stroke injection control unit configured to control the fuel injection valve to inject fuel from the injection holes in a period including a part of a compression stroke period of the internal combustion engine.

17. The fuel injection valve according to claim 1, wherein the valve body has a valve body tip end face in a curved shape protruding toward the injection holes,
the injection hole body has a body bottom surface in a curved shape dented toward the injection holes,
the valve body tip end face and the body bottom surface are separated from each other at a needle separation distance in the direction of the center axis, and
the needle separation distance continuously decreases in a radial direction, which is perpendicular to the center axis, from a center of each of the inflow ports toward the center axis.

18. The fuel injection valve according to claim 1, further comprising:
a stopper configured to make contact with the valve body, when the valve body moves along the center axis, to restrict movement of the valve body toward a side opposite of the injection holes, wherein
the farthest position in the movable range of the valve body is a position of the valve body in the direction of the center axis in a state where the valve body is in contact with the stopper.

19. The fuel injection valve according to claim 18, wherein
a radius of curvature of a body bottom surface of the injection hole body is constant throughout the body bottom surface,
the radius of curvature of the body bottom surface is larger than a radius of curvature of a valve body tip end face of the valve body, and
the body bottom surface and the valve body tip end face are opposed to each other in the direction of the center axis.

20. The fuel injection valve according to claim 19, wherein
a number of the injection holes is 6 or more.

21. The fuel injection valve according to claim 19, wherein
a number of the injection holes is 10.

22. The fuel injection valve according to claim 1, wherein the inter-injection hole distance is the distance along a circumference in the circumferential direction around the center axis between the inflow ports, which are adjacent to each other in the circumferential direction, and
the inflow ports, which are adjacent to each other in the circumferential direction, are away from positions which are on a straight line passing through the center axis.

23. The fuel injection valve according to claim 1, wherein each of the injection holes has a singular outflow port that corresponds to corresponding one of the inflow ports, and
the singular outflow port is in an outermost surface of the nozzle.

24. The fuel injection valve according to claim 1, wherein all of the inter-injection hole distances are equal to each other for four or more of the injection holes placed concentrically around the center axis.

25. The fuel injection valve according to claim 1, wherein three or more of the injection holes placed concentrically around the center axis are placed on an opposite side of an ignition plug in a combustion chamber of the internal combustion engine.

26. The fuel injection valve according to claim 1, wherein all of the inflow ports of the injection hole body have respective center points which are equidistant from the center axis.

27. The fuel injection valve according to claim 1, wherein a virtual circle passes through the center point of each of the injection holes of the valve body.

* * * * *